(12) United States Patent
Nakajima et al.

(10) Patent No.: US 9,885,966 B2
(45) Date of Patent: *Feb. 6, 2018

(54) ELECTROSTATIC CHARGE IMAGE DEVELOPING TONER, ELECTROSTATIC CHARGE IMAGE DEVELOPER AND TONER CARTRIDGE

(71) Applicant: FUJI XEROX CO., LTD., Tokyo (JP)

(72) Inventors: Tomohito Nakajima, Minamiashigara (JP); Hiroyoshi Okuno, Minamiashigara (JP); Satoshi Inoue, Minamiashigara (JP); Yoshifumi Iida, Minamiashigara (JP); Yuka Zenitani, Minamiashigara (JP); Yoshifumi Eri, Minamiashigara (JP); Takeshi Iwanaga, Minamiashigara (JP); Sakae Takeuchi, Minamiashigara (JP); Shunsuke Nozaki, Tokyo (JP); Yasuo Kadokura, Minamiashigara (JP); Yasuhisa Morooka, Minamiashigara (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,939

(22) Filed: Aug. 30, 2016

(65) Prior Publication Data

US 2017/0227859 A1    Aug. 10, 2017

(30) Foreign Application Priority Data

Feb. 10, 2016  (JP) .................................. 2016-024114
Feb. 10, 2016  (JP) .................................. 2016-024143

(51) Int. Cl.
*G03G 9/08*        (2006.01)
*G03G 9/097*       (2006.01)
(Continued)

(52) U.S. Cl.
CPC ............. *G03G 9/08* (2013.01); *C08F 212/08* (2013.01); *C08G 63/195* (2013.01);
(Continued)

(58) Field of Classification Search
CPC ........... G03G 9/09708; G03G 9/09716; G03G 9/09725
(Continued)

(56) References Cited

U.S. PATENT DOCUMENTS

| 6,777,151 B2 | 8/2004 | Hagi et al. |
| 2003/0129510 A1 | 7/2003 | Hagi et al. |
| 2017/0073236 A1* | 3/2017 | Okuno .................... C07F 7/025 |

FOREIGN PATENT DOCUMENTS

| JP | 2003-202702 A | 7/2003 |
| JP | 2005-125258 A | 5/2005 |
| JP | 2007-279607 A | 10/2007 |

* cited by examiner

*Primary Examiner* — Mark A Chapman
(74) *Attorney, Agent, or Firm* — Oliff PLC

(57) ABSTRACT

An electrostatic charge image developing toner containing: toner particles; and silica particles having a compaction aggregation degree of from 60% to 95% and a particle compaction ratio of from 0.20 to 0.40, an electrostatic charge image developer containing the electrostatic charge image developing toner, and a toner cartridge that accommodates the electrostatic charge image developing toner and is detachable from an image forming apparatus.

19 Claims, 2 Drawing Sheets

(51) Int. Cl.
 *C08F 212/08* (2006.01)
 *C08G 63/195* (2006.01)
 *G03G 9/087* (2006.01)
 *G03G 15/08* (2006.01)
(52) U.S. Cl.
 CPC ....... *G03G 9/0819* (2013.01); *G03G 9/08755* (2013.01); *G03G 9/09708* (2013.01); *G03G 9/09716* (2013.01); *G03G 9/09725* (2013.01); *G03G 15/0865* (2013.01)
(58) Field of Classification Search
 USPC ...................................................... 430/108.7
 See application file for complete search history.

ELECTROSTATIC CHARGE IMAGE DEVELOPING TONER, ELECTROSTATIC CHARGE IMAGE DEVELOPER AND TONER CARTRIDGE

CROSS-REFERENCE TO RELATED APPLICATIONS

This application is based on and claims priority under 35 USC 119 from Japanese Patent Application No. 2016-024114 filed on Feb. 10, 2016 and Japanese Patent Application No. 2016-024143 filed on Feb. 10, 2016.

BACKGROUND

1. Technical Field

The present invention relates to an electrostatic charge image developing toner, an electrostatic charge image developer and a toner cartridge, which are used for developing an electrostatic charge image in electrophotography and electrostatic recording methods.

2. Related Art

Methods for visualizing image information via an electrostatic charge image, such as electrophotography, are currently utilized in various fields. The electrophotography is a method of forming the image information as an electrostatic charge image on the surface of an image holding member (photoreceptor) through charging and exposure steps and subsequently visualizing the image information via a developing step of developing the image as a toner image on the surface of the image holding member using a developer containing a toner; a transfer step of transferring the toner image onto a recording medium such as paper; and a fixing step of fixing the toner image onto the surface of a recording medium. On this occasion, since toner particles, additives, and discharge products remain on the surface of the image holding member after the transfer step is finished, it is usual to comprise a cleaning step of removing them prior to next image formation.

As a cleaning unit that removes the transfer remaining toner and the like, there may be mentioned a method of removing them individually with a far brush, a magnetic brush, or the like, a method of using a member (a cleaning blade) obtained by forming an elastic material into a blade-shaped one, and the like. Owing to convenience and inexpensiveness, there is generally employed the latter mechanism in which an edge part of the blade is brought into contact with the surface of the image holding member like a wiper of an automobile and the remaining toner and the like are collected and scraped off with the rotational moving of the image holding member.

SUMMARY

According to an aspect of the invention, there is provided an electrostatic charge image developing toner comprising: toner particles; and silica particles having a compaction aggregation degree of from 60% to 95% and a particle compaction ratio of from 0.20 to 0.40.

DETAILED DESCRIPTION

Figure 1:
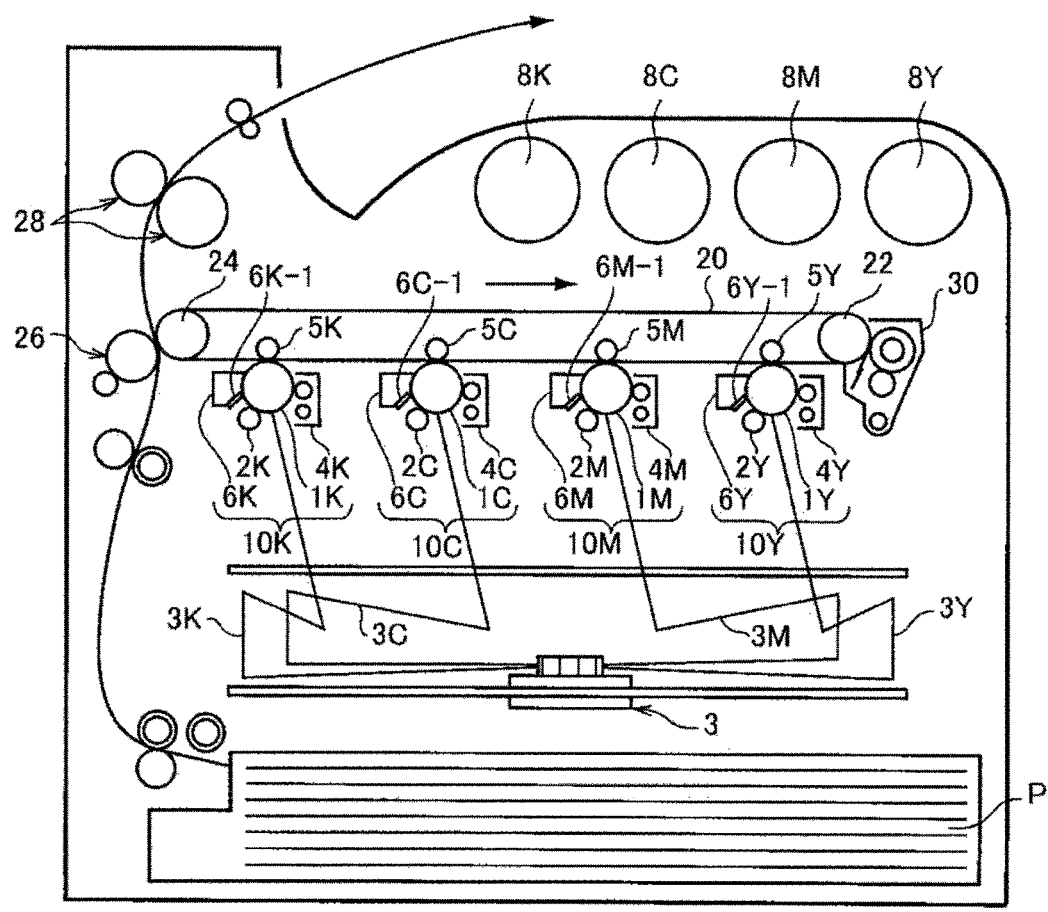
FIG. 1 is a schematic configuration diagram showing an example of an image forming apparatus according to the exemplary embodiment.

Hereinafter, exemplary embodiments which are examples of the invention will be described.

As a device for charging an image holding member, a non-contact corona discharger has been hitherto used but in recent years, for the reasons of miniaturization of the device, energy saving, cost reduction, and also undesirable ozone generation and the like, a contact-type (or proximity type) charging mechanism has been frequently employed. The contact-type charger is represented by BCR (bias charge roll) in a form that a metal shaft is covered with a semi-conductive elastic material in a layer form. In this case, since charging is effected by local discharge at the place where the roll surface comes into contact with the image holding member surface, it is important for good latent image formation that individual surfaces are always kept clean. When a cleaning ability is poor and a charging step is performed in a state that "foreign matters" such as the toner and external additives remain on the image holding member, not only uniform discharge is prevented but also compounds resulting from discharge (discharge products) are easily produced. It is considered that the compounds invade the image holding member surface to degrade it and becomes an adhesive component that promotes foreign matter attachment. In this regard, the role of the cleaning step becomes more important in the electrophotographic process using the contact-type charging mechanism such as BCR, in view of image quality maintenance with time.

On the other hand, in the cleaning step using a blade, since frictional resistance of a contact face between the blade made of an elastic material (elastic blade) and the image holding member surface is large, it is difficult to slide the elastic blade alone on the image holding member surface. Therefore, since a lubricating component becomes necessary, a material called a lubricant is sometimes formulated by various methods. Alternatively, there is a case where functional design is performed so that, at the time when an additive (external additive) or the like to be given on the toner particle surface is detached from the toner surface during the developing and transfer steps to migrate onto the image holding member surface and accumulated at a front edge of the elastic blade (the state is referred to as dam layer formation), the elastic blade keeps a suitable contact state without engagement through trapping of a part of the additive or the like in the contact part between the elastic blade and the image holding member to allow it to pass through the contact part.

However, the supply of the external additive component to the elastic blade contact part easily varies depending on the developing and transfer conditions. In the case where the supply is insufficient, "chattering" and "peeling" of the elastic blade is prone occur under high-temperature and high-humidity conditions where frictional force is easily increased and contrarily, damages such as "chipping" and "abrasion" of the blade edge are prone to occur under low-temperature and low-humidity conditions where the blade is easily hardened, so that the aforementioned dam layer is broken and thereby the performance of removing the toner, the external additives, the discharge products, and the like remaining on the image holding member is easily lowered.

Furthermore, an elastic blade that cannot uniformly come into contact with the image holding member surface may rub and attach the toner, the external additive, discharge products, and the like onto the image holding member and, through their accumulation, is prone to generate such a phenomenon of "filming" that a film composed of a composition of the toner and the like is formed on the image holding member surface. When the filming phenomenon proceeds, charging and developing ability of the coated part is remarkably lowered, so that streaky or spotty image quality defects are generated on the output images.

As mentioned above, from the viewpoint of designing an external addition structure of a toner, it becomes a problem to perform a control so as to secure the blade scraping performance through detachment of a part of the functional particles and accumulation thereof at the cleaning part, in addition to maintenance of intrinsic charging performance and storage performance by retaining functional particles added to the toner particles on the surface of the toner particles. However, as the external additive, a property of appropriately detaching from the toner surface (fluidity/attaching properties) and a property of forming a dam layer without escaping from the blade front edge (aggregating properties) are contradicting properties and thus there has hitherto not found a material satisfying the both properties.

<Electrostatic Charge Image Developing Toner>

An electrostatic charge image developing toner according to the exemplary embodiment (hereinafter, may be referred to as a "toner") includes toner particles and an external additive.

The external additive contains silica particles having a compression aggregation degree of from 60% to 95% or a particle compression ratio of from 0.20 to 0.40 (hereinafter also referred to as "specified silica particles").

The toner according to this exemplary embodiment is excellent in charge maintaining properties and suppresses the generation of filming on a photoreceptor surface which may be generated when images are repeatedly formed. The reasons are presumed as follows.

The silica particles as the external additive are expected to exhibit a spacer function (cushioning function) between the toner particles in order to improve storage performance and fluidity but, in general, also from the influence of the spherical shape, by stirring in the developing unit, the force imparted in the developing step and the transferring step, and the like, the silica particles are prone to gather or be buried in depressions on the toner particle surface or further detach from the toner particle surface to attach and diffuse onto the photoreceptor surface.

Moreover, there is a case where a part of the toner migrated from the developing unit to the surface of the photoreceptor by development remains on the surface of the photoreceptor without being transferred to a recording medium or the like. When the thus remaining toner and released external additive component reach the cleaning step, they are dammed at the front edge of the cleaning part (a site of the contact part at a downstream side in the rotation direction between the cleaning blade and the photoreceptor) to form an aggregate (hereinafter also referred to as "external addition dam") pressed and fixed with the pressure from the cleaning blade. The external addition dam contributes an improvement in cleaning properties for scraping and collecting the remaining toner particles but, since the silica particles released from the toner particles have smaller particle diameter as compared to that of the toner particles, so-called pass-through is prone to occur with passing through the front edge part of the cleaning blade. It is considered that, when the silica particles passing therethrough are attached and fixed to the surface of the photoreceptor by the pressure with the cleaning blade and BCR, they become nuclei and silica particles and toner components are further attached thereto to become a filming state.

On the other hand, in the toner to which silica particles are externally added, when the external addition structure of the silica particles (a state of attaching the silica particles to the toner particles) is changed, the fluidity of the toner decreases and the charge maintaining properties decreases in some cases. The change in the external addition structure occurs resulting from embedding of the silica particles, localization through migration on the toner particles, detachment from the toner particles, and the like caused by mechanical stirring stress in the development unit.

Moreover, in the case where a developer contains a carrier, contact charging between the carrier and the toner is inhibited by the migration of the external additive released from the toner particles to the carrier, surface resistance of the carrier increases, and thus charging amount is changed, so that the charge maintaining properties are prone to decrease.

Since silica particles generally have low attaching properties on the surface, particles are difficult to aggregate each other, so that bulk density tends to decrease. Based on the property, it is known that the fluidity of the particles are good and thus silica particles are used as a fluidity improver of a toner.

On the other hand, for the purpose of enhancing dispersibility on the toner particle surface together with the fluidity of the silica particles, there is known a technology of modifying the surface of the silica particles using a hydrophobilizing agent. According to the technology, the fluidity of the silica particles and dispersibility on the toner particle surface are improved but the aggregating properties are still low.

Moreover, there is also known a technology of modifying the surface of silica particles using a hydrophobilizing agent and a silicone oil in combination. According to the technology, the attaching properties to the toner particles are improved and also the aggregating properties are improved. However, contrarily, the fluidity and the dispersibility to the toner particles are prone to decrease.

That is, in the modification of the silica particles, it is said that the fluidity and the dispersibility to the toner particles contradict with the aggregating properties and the attaching properties to the toner particles.

On the other hand, the specified silica particles whose compression aggregation degree and particle compression ratio satisfy the above ranges are satisfactory in four characteristics of the fluidity, the dispersibility to the toner particles, the aggregating properties, and the attaching properties to the toner particles.

Here, there will be described significance of controlling the compression aggregation degree and the particle compression ratio of the specified silica particles to the above ranges.

First, there is described the significance of controlling the compression aggregation degree to from 60% to 95%.

The compression aggregation degree is an index showing the aggregating properties of silica particles and the attaching properties to the toner particles. The index is, after the silica particles are compressed to obtain a molded body of the silica particles, shown by a degree of difficulty of loosening of the molded body of the silica particle at the time when the molded body is dropped on a sieve net.

Accordingly, as the compression aggregation degree increases, it is shown that there is a tendency that the silica particles are prone to increase in bulk density and increase in aggregation force (intermolecular force) and attaching force to the toner particles also tends to increase. Incidentally, details of the calculation method of the compression aggregation degree will be mentioned later.

Therefore, the specified silica particles whose compression aggregation degree is controlled so high as from 60% to 95% has good attaching properties to the toner particles and aggregating properties. However, from the viewpoint of securing the fluidity and the dispersibility to the toner particles while the attaching properties to the toner particles and the aggregating properties are made good, an upper limit value of the compression aggregation degree is set to 95%.

Next, there is described the significance of controlling the particle compression ratio to from 0.20 to 0.40.

The particle compression ratio is an index showing the fluidity of silica particles. Specifically, the particle compression ratio is shown by a ratio of a difference between aerated apparent specific gravity and packed apparent specific gravity to the packed specific gravity ((packed apparent specific gravity—aerated apparent specific gravity)/packed apparent specific gravity).

Accordingly, a lower particle compression ratio shows higher fluidity of the silica particles. When the fluidity is high, there is a tendency that the dispersibility to the toner particles also increases. Incidentally, detail of the calculation method of the particle compression ratio will be mentioned later.

Therefore, the specified silica particles whose particle compression ratio is controlled so low as from 0.20 to 0.40 has good fluidity and dispersibility to the toner particles. However, from the viewpoint of improving the attaching properties to the toner particles and the aggregating properties while the fluidity and the dispersibility to the toner particles are made good, a lower limit value of the particle compression ratio is set to 0.20.

From the above, the specified silica particles have particular properties that they are easily fluidized and dispersed to the toner particles and also cohesive force and attaching power to the toner particles are high. Therefore, the specified silica particles whose compression aggregation degree and particle compression ratio satisfy the above ranges become silica particles silica particles having properties of high fluidity and dispersibility to the toner particles and also high aggregating properties and attaching properties to the toner particles.

Next, there will be described presumed action when the specified silica particles are externally added to the toner particles.

First, since the specified silica particles have high fluidity and dispersibility to the toner particles, when they are externally added to the toner particles, they are easily attached to the surface of the toner particles in a nearly homogeneous state. The specified silica particles once attached to the toner particles are less prone to migrate on the toner particles and be released from the toner particles by a mechanical load imparted by stirring and the like in the developing unit owing to high attaching properties to the toner particles. That is, a change in the external addition structure is hard to occur. Thereby, the fluidity of the toner particles themselves increases and the high fluidity is easily maintained. Moreover, even when stirred in the developing unit, the specified silica particles are prevented from migrating from the toner particles to the carrier. As a result, it is considered that a decrease in the charge maintaining properties is suppressed.

On the other hand, the specified silica particles released from the toner particles and supplied to the front edge of the cleaning part by the mechanical load induced by stirring, mixing, and the like in the developing device and an electrostatic load in the developing/transfer steps are aggregated by the pressure from the cleaning blade to form a strong external additive dam owing to high aggregating properties. Therefore, even when the specified silica particles are released from the toner particles, they are hard to escape on the photoreceptor surface resulting from easy compression/aggregation thereof at the cleaning part and thus it is considered that the occurrence of filming is suppressed.

In the toner according to this exemplary embodiment, the specified silica particles further preferably have a particle dispersion degree of from 90% to 100%.

Here, there is described the significance that the particle dispersion degree of the specified silica particles is from 90% to 100%.

The particle dispersion degree is an index showing the dispersibility of silica particles. The index is shown by a degree of easiness of dispersion of the silica particles to the toner particles in a primary particle state. Specifically, when calculated coverage of the toner particle surface with the silica particles is taken as $C_0$ and measured coverage is taken as C, the particle dispersion degree is shown by a ratio of the measured coverage C of an object to be attached to the calculated coverage $C_0$ (Measured coverage C/calculated coverage $C_0$).

Accordingly, a higher particle dispersion degree shows that the silica particles are hard to aggregate and are easily dispersed to the toner particles in a primary particle state. Incidentally, details of the calculation method of the particle dispersion degree will be mentioned later.

When the particle dispersion degree is controlled so high as from 90% to 100% while the compression aggregation degree and the particle compression ratio are controlled to the above ranges, the dispersibility of the specified silica particles to the toner particles becomes more satisfactory. Thereby, the fluidity of the toner particles themselves is further enhanced and the high fluidity is easily maintained. As a result, the specified silica particles are further easily attached to the surface of the toner particles in a nearly homogeneous state and a decrease in the charge maintaining properties is easily suppressed.

In the toner according to the exemplary embodiment, as the specified silica particles having properties that the fluidity and the dispersibility to the toner particles are high and the aggregating properties and the attaching properties to the toner particles are also high as mentioned above, there are suitably mentioned silica particles where a siloxane compound having a relatively large weight average molecular weight is attached to the surface. Specifically, there are suitably mentioned silica particles where a siloxane compound having a viscosity of from 1,000 cSt to 50,000 cSt is attached to the surface (preferably attached in a surface attaching amount of from 0.01% by mass (% by weight) to 5% by mass (% by weight)). The specified silica particles are, for example, obtained by a method of treating the surface of silica particles using a siloxane compound having a viscosity of from 1,000 cSt to 50,000 cSt so that the surface attached amount becomes from 0.01% by mass to 5% by mass.

Here, the surface attaching amount is a ratio with respect to silica particles before treating the surface of the silica particles (untreated silica particles). Hereinafter, the silica particles before surface treatment (i.e., untreated silica particles) are also referred to as simply "silica particles".

In the specified silica particles subjected to the surface treatment of the surface of the silica particles using a siloxane compound having a viscosity of from 1,000 cSt to 50,000 cSt so that the surface attaching amount becomes from 0.01% by mass to 5% by mass, the fluidity and the dispersibility to the toner particles and also the aggregating properties and the attaching properties to the toner particles toner particles are enhanced and thus the above requirements for the compression aggregation degree and the particle compression ratio are easily satisfied. Also, a decrease in the charge maintaining properties and the generation of filming on the photoreceptor surface are easily suppressed. The reason is not clear but the following reasons are considered.

When a siloxane compound having a relatively high viscosity, the viscosity being in the above range, is attached to the silica particle surface in a small amount within the above range, a function derived from the characteristics of the siloxane compound on the silica particle surface is exhibited. The mechanism is not clear but, when the silica particles flow, by the fact that the siloxane compound having a relatively high viscosity is attached in a small amount within the above range, releasability derived from the siloxane compound is easily exhibited or the attaching properties of the silica particles each other is reduced by the reduction of interparticle force owing to steric hindrance of the siloxane compound. Thereby, the fluidity of the silica particles and the dispersibility to the toner particles are further enhanced.

On the other hand, when the silica particles are pressurized, long molecular chains of the siloxane compound on the silica particle surface are entangled, closest packing ability of the silica particles is enhanced, and aggregation of the silica particles themselves is strengthened. It is considered that the aggregation force of the silica particles resulting from the entanglement of the long molecular chains of the siloxane compound is released when the silica particles are fluidized. In addition to this, the attaching force to the toner particles is also enhanced by the long molecular chain of the siloxane compound on the silica particle surface.

From the above, in the specified silica particles wherein the siloxane compound whose viscosity is in the above range is attached to the silica particle surface in a small amount within the above range, the above requirements for the compression aggregation degree and the particle compression ratio are easily satisfied and also the above requirement for the particle dispersion degree is easily satisfied.

Hereinafter, configuration of the toner will be described in detail.

(Toner Particles)

The toner particles contain at least a binder resin. The toner particles may contain, if necessary, a colorant, a release agent, and other additives and the like.

Examples of the binder resins include vinyl resins composed of each of homopolymers of polymerizable monomers such as styrene-based polymerizable monomers (e.g., styrene, α-methyl styrene, etc.), (meth)acrylic polymerizable monomers (e.g., (meth)acrylic acid, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate, etc.), ethylenically unsaturated nitrile-based polymerizable monomers (e.g., acrylonitrile, methacrylonitrile, etc.), vinyl ether-based polymerizable monomers (e.g., vinyl methyl ether, vinyl isobutyl ether, etc.), vinyl ketone-based polymerizable monomers (e.g., vinyl methyl ketone, vinyl ethyl ketone, vinyl isopropenyl ketone, etc.), olefin-based polymerizable monomers (e.g., ethylene, propylene, butadiene, etc.), or each of copolymers obtained by combining two or more kinds of these polymerizable monomers.

Furthermore, examples of the binder resin also include non-vinyl resins such as an epoxy resin, a polyester resin, a polyurethane resin, a polyamide resin, a cellulose resin, a polyether resin, and a modified rosin, a mixture of these and the above vinyl resin, or a graft polymer obtained by polymerizing a vinyl monomer in the presence thereof.

These binder resins may be used alone or two or more kinds thereof may be used in combination.

Of these, a polyester resin is suitable.

As the polyester resin, a well-known polyester resin may be mentioned, for example.

Examples of the polyester resin include polycondensates of polybasic carboxylic acids and polyhydric alcohols. A commercially available product or a synthesized product may be used as the polyester resin.

Examples of the polybasic carboxylic acid include aliphatic dicarboxylic acids (e.g., oxalic acid, malonic acid, maleic acid, fumaric acid, citraconic acid, itaconic acid, glutaconic acid, succinic acid, alkenylsuccinic acid, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, and naphthalenedicarboxylic acid), anhydrides thereof, or lower alkyl esters (having, for example, from 1 to 5 carbon atoms) thereof. Among these, for example, aromatic dicarboxylic acids are preferable as the polybasic carboxylic acid.

As the polybasic carboxylic acid, a tri- or higher-basic carboxylic acid affording a crosslinked structure or a branched structure may be used in combination together with a dicarboxylic acid. Examples of the tri- or higher-basic carboxylic acid include trimellitic acid, pyromellitic acid, anhydrides thereof, or lower alkyl esters (having, for example, from 1 to 5 carbon atoms) thereof.

The polybasic carboxylic acids may be used alone or two or more kinds thereof may be used in combination.

Examples of the polyhydric alcohol include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexanedimethanol, and hydrogenated bisphenol A), and aromatic diols (e.g., ethylene oxide adduct of bisphenol A and propylene oxide adduct of bisphenol A). Among these, for example, aromatic diols and alicyclic diols are preferred, and aromatic diols are more preferred as the polyhydric alcohol.

As the polyhydric alcohol, a tri- or higher-hydric alcohol affording a crosslinked structure or a branched structure may be used in combination together with a diol. Examples of the tri- or higher-hydric alcohol include glycerin, trimethylolpropane, and pentaerythritol.

The polyhydric alcohols may be used alone or two or more kinds thereof may be used in combination.

The glass transition temperature (Tg) of the polyester resin is preferably from 50° C. to 80° C., and more preferably from 50° C. to 65° C.

Incidentally, the glass transition temperature is determined by a DSC curve obtained by differential scanning calorimetry (DSC), and more specifically, is determined by "Extrapolated Starting Temperature of Glass Transition"

disclosed in a method of determining a glass transition temperature of JIS K7121-1987 "Measuring Methods for Transition Temperature of Plastics".

The weight average molecular weight (Mw) of the polyester resin is preferably from 5,000 to 1,000,000, and more preferably from 7,000 to 500,000.

The number average molecular weight (Mn) of the amorphous polyester resin is preferably from 2,000 to 100,000.

The molecular weight distribution Mw/Mn of the amorphous polyester resin is preferably from 1.5 to 100, and more preferably from 2 to 60.

Incidentally, the weight average molecular weight and the number average molecular weight are measured by gel permeation chromatography (GPC). The molecular weight measurement by GPC is performed with a THF solvent using GPC.HLC-8120 GPC manufactured by Tosoh Corporation as a measurement device and using a column TSKgel Super HM-M (15 cm) manufactured by Tosoh Corporation. The weight average molecular weight and the number average molecular weight are calculated using a calibration curve of molecular weight created with a monodisperse polystyrene standard sample from results of this measurement.

The polyester resin is obtained by a well-known preparing method. Specifically, it is obtained by a method of conducting a reaction at a polymerization temperature set to, for example, 180° C. to 230° C., if necessary, under reduced pressure in the reaction system, while removing water or an alcohol generated during condensation.

Incidentally, in the case where the raw material monomers are not dissolved or compatibilized under a reaction temperature, a high-boiling-point solvent may be added as a solubilizing agent to dissolve the monomers. In this case, a polycondensation reaction is conducted while distilling away the solubilizing agent. When a monomer having poor compatibility is present in a copolymerization reaction, the monomer having poor compatibility and an acid or an alcohol to be polycondensed with the monomer may be previously condensed and then polycondensed with the major component.

Moreover, as the binder resin, a styrene-(meth)acrylic resin is also preferable.

The styrene-(meth)acrylic resin is a copolymer obtained by at least copolymerizing a styrene-based polymerizable monomer (polymerizable monomer having a styrene skeleton) and a (meth)acrylic polymerizable monomer (polymerizable monomer having a (meth)acryloyl skeleton).

Incidentally, "(meth)acrylic" is an expression including both of "acrylic" and "methacrylic".

Examples of the styrene-based polymerizable monomer include styrene, alkyl-substituted styrenes (e.g., α-methyl styrene, 2-methyl styrene, 3-methyl styrene, 4-methyl styrene, 2-ethyl styrene, 3-ethyl styrene, 4-ethyl styrene, etc.), halogen substituted styrenes (e.g., 2-chlorostyrene, 3-chlorostyrene, 4-chlorostyrene, etc.), vinyl naphthalene, and the like. The styrene-based polymerizable monomers may be used alone or two or more kinds thereof may be used in combination.

Among these, styrene is preferable as the styrene-based monomer, in viewpoints of easiness of reaction, easiness of controlling the reaction, and availability.

Examples of the (meth)acrylic polymerizable monomer include (meth)acrylic acid and (meth)acrylic acid esters. Examples of (meth)acrylic acid esters include (meth)acrylic acid alkyl esters (e.g., methyl (meth)acrylate, ethyl (meth) acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth) acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, cyclohexyl (meth)acrylate, or t-butylcyclohexyl (meth)acrylate), (meth) acrylic acid aryl esters (e.g., phenyl (meth)acrylate, biphenyl (meth)acrylate, diphenylethyl (meth)acrylate, t-butylphenyl (meth)acrylate, and terphenyl (meth)acrylate), dimethylaminoethyl (meth)acrylate, diethylaminoethyl (meth)acrylate, methoxyethyl (meth)acrylate, 2-hydroxyethyl (meth)acrylate, β-carboxyethyl (meth)acrylate, and (meth)acrylamide. The (meth)acrylic polymerizable monomers may be used alone or two or more kinds thereof may be used in combination.

A copolymerization ratio of the styrene-based polymerizable monomer and the (meth)acrylic polymerizable monomer (styrene-based polymerizable monomer/(meth)acrylic polymerizable monomer based on weight) can be controlled according to desired thermal properties (e.g., glass transition temperature) and is preferably from 85/15 to 70/30, for example.

The styrene-(meth)acrylic resin may have a crosslinked structure. As the styrene-(meth)acrylic resin having a crosslinked structure, a crosslinked material obtained by copolymerizing at least the styrene-based polymerizable monomer, the (meth)acrylic polymerizable monomer, and a crosslinking monomer, followed by partial crosslinking, for example.

Examples of the crosslinking monomer include a bi- or higher functional crosslinking agent. Examples of the bifunctional crosslinking agent include divinylbenzene, divinylnaphthalene, a di(meth)acrylate compound (e.g., diethylene glycol di(meth)acrylate, methylenebis(meth) acrylamide, decanediol diacrylate, or glycidyl (meth)acrylate), polyester type di(meth)acrylate, and 2-([1'-methylpropylideneamino]carboxyamino)ethyl methacrylate.

Examples of the polyfunctional crosslinking agent include tri(meth)acrylate compounds (e.g., pentaerythritol tri(meth)acrylate, trimethylolethane tri(meth)acrylate, trimethylolpropane tri(meth)acrylate, etc.), tetra(meth)acrylate compounds (e.g., tetramethylolmethane tetra(meth)acrylate, oligoester (meth)acrylate, etc.), 2,2-bis(4-methacryloxy, polyethoxy phenyl) propane, diallyl phthalate, triallyl cyanurate, triallyl isocyanurate, triallyl trimellitate, and diaryl chlorendate.

A copolymerization ratio of the crosslinking monomer with respect to the whole monomers (crosslinking monomer/ whole monomers based on mass) is suitably from 2/1000 to 30/1000, for example.

The glass transition temperature (Tg) of the styrene-(meth)acrylic resin is, in view of fixability, suitably from 50° C. to 75° C., preferably from 55° C. to 65° C., and more preferably from 57° C. to 60° C., for example.

The weight average molecular weight of the styrene-(meth)acrylic resin is, in view of storage stability, suitably from 30,000 to 200,000, preferably from 40,000 to 100,000, and more preferably from 50,000 to 80,000, for example.

The content of the binder resin is, in view of functionality exhibition, for example, preferably from 40% by mass to 95% by mass, more preferably from 50% by mass to 90% by mass, and even more preferably from 60% by mass to 85% by mass with respect to the whole toner particles. Incidentally, in the case of forming a so-called clear toner using no colorant, the content is preferably from 70% by mass to 90% by mass.

—Colorant—

Examples of the colorant include various pigments such as carbon black, chrome yellow, Hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, Rhodamine B Lake, Lake Red C, pigment red, rose bengal, aniline blue, ultramarine blue, calco oil blue, methylene blue chloride, phthalocyanine blue, pigment blue, phthalocyanine green, and malachite green oxalate, and various dyes such as acridine dyes, xanthene dyes, azo dyes, benzoquinone dyes, azine dyes, anthraquinone dyes, thioindigo dyes, dioxadine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorants may be used alone or two or more kinds thereof may be used in combination. Moreover, the colorant may not necessarily be used and may not be used depending on the uses.

If necessary, the colorant may be surface-treated or used in combination with a dispersing agent. Plural kinds of colorants may be used in combination.

The content of the colorant is, for example, preferably from 0% by mass to 30% by mass, and more preferably from 3% by mass to 15% by mass with respect to the whole toner particles.

—Release Agent—

Examples of the release agent include, hydrocarbon waxes; natural waxes such as carnauba wax, rice wax, and candelilla wax; synthetic or mineral/petroleum waxes such as Fischer Tropsch wax, montan wax; and ester waxes such as fatty acid esters and montanic acid esters. The release agent is not limited thereto.

The melting temperature of the release agent is preferably from 50° C. to 110° C., and more preferably from 60° C. to 100° C.

Incidentally, the melting temperature is obtained from "melting peak temperature" described in the method of obtaining a melting temperature in JIS K7121-1987 "Measuring Methods for Transition Temperatures of Plastics", from a DSC curve obtained by differential scanning calorimetry (DSC).

The content of the release agent is, for example, preferably from 1% by mass to 20% by mass, and more preferably from 5% by mass to 15% by mass with respect to the whole toner particles.

—Other Additives—

Examples of other additives include well-known additives such as a magnetic material, a charge-controlling agent, and an inorganic powder. The toner particles contain these additives as internal additives.

—Characteristics and the Like of Toner Particles—

The toner particles may be toner particles having a single-layer structure, or toner particles having a so-called core/shell structure composed of a core (core particle) and a coating layer (shell layer) coated on the core.

Here, toner particles having a core/shell structure is preferably composed of, for example, a core containing a binder resin, and if necessary, other additives such as a colorant and a release agent and a coating layer containing a binder resin.

The volume average particle diameter (D50v) of the toner particles is preferably from 2 μm to 10 μm, and more preferably from 3 μm to 8 μm.

Various average particle diameters and various particle size distribution indices of the toner particles are measured using a Coulter Multisizer II (manufactured by Beckman Coulter, Inc.) and using ISOTON-II (manufactured by Beckman Coulter, Inc.) as an electrolyte.

In the measurement, from 0.5 mg to 50 mg of a measurement sample is added to 2 ml of a 5% aqueous solution of a surfactant (preferably sodium alkylbenzenesulfonate) as a dispersing agent. The obtained material is added to 100 ml to 150 ml of the electrolyte.

The electrolyte in which the sample is suspended is subjected to a dispersion treatment using an ultrasonic disperser for 1 minute, and a particle size distribution of particles having a particle diameter of from 2 μm to 60 μm is measured by a Coulter Multisizer II using an aperture having an aperture diameter of 100 μm. Incidentally, 50,000 particles are sampled.

Cumulative distributions by volume and by number are drawn from the side of the smallest diameter with respect to particle size ranges (channels) separated based on the measured particle size distribution. The particle diameter when the cumulative percentage becomes 16% is defined as that corresponding to a volume average particle diameter D16v and a number average particle diameter D16p, while the particle diameter when the cumulative percentage becomes 50% is defined as that corresponding to a volume average particle diameter D50v and a number average particle diameter D50p. Furthermore, the particle diameter when the cumulative percentage becomes 84% is defined as that corresponding to a volume average particle diameter D84v and a number average particle diameter D84p.

Using these, a volume average particle size distribution index (GSDv) is calculated as $(D84v/D16v)^{1/2}$, while a number average particle size distribution index (GSDp) is calculated as $(D84p/D16p)^{1/2}$.

The average circularity of the toner particles is preferably from 0.94 to 1.00 and more preferably from 0.95 to 0.98.

The average circularity of the toner particles is determined by (equivalent circle circumferential length)/(circumferential length) [(circumferential length of circle having the same projection area as particle image)/(circumferential length of particle projected image)]. Specifically, it is a value measured by the following method.

First, after a toner (developer) to be a measurement target is dispersed in water containing a surfactant, an ultrasonic treatment is performed to obtain external additive-removed toner particles. The obtained toner particles are collected under suction to form a flat stream and particle images are captured as still images by instantaneous stroboscopic light emission and the average circularity is determined on a flow-type particle image analyzer (FPIA-2100 manufactured by Sysmex Corporation) that image-analyzes the particle images. The number of sampling at the time of determining the average circularity is 3500.

(External Additive)

The external additive contains the specified silica particles. The external additive may contain other external additives other than the specified silica particles. That is, the toner particles may be externally added with the specified silica particles alone or may be externally added with the specified silica particles and other external additives.

[Specified Silica Particles]

—Compression Aggregation Degree—

The compression aggregation degree of the specified silica particles is from 60% to 95% but, from the viewpoints of securing the fluidity and the dispersibility to the toner particles while the aggregating properties and the attaching properties to the toner particles are made good in the specified silica particles (i.e., viewpoints of the charge maintaining properties and suppression of occurrence of filming on the photoreceptor surface), is preferably from 65% to 95% and more preferably 70% to 95%.

The compression aggregation degree is calculated by the method shown below.

The specified silica particles are filled in an amount of 6.0 g into a disk-shape mold having a diameter of 6 cm. Then, the mold is compressed under a pressure of 5.0 t/cm$^2$ for 60 seconds using a compression molding machine (manufactured by Maekawa Testing Machine MFG. Co., Ltd.) to obtain a compressed disk-shape molded body of the specified silica particles (hereinafter referred to as "molded body before dropping"). Thereafter, mass of the molded body before dropping is measured.

Then, the molded body before dropping is placed on a sieve net having a mesh opening of 600 μm and the molded body before dropping is dropped under conditions of a vibration width of 1 mm and a vibration time of 1 minute by a vibration sieving machine (manufactured by Tsutsui Scientific Instruments Co., Ltd., Item No.: VIBRATING MVB-1). Thereby, the specified silica particles are dropped from the molded body before dropping through the sieve net and the molded body of the specified silica particles remains on the sieve net. Thereafter, mass of the remaining molded body of the specified silica particles (hereinafter referred to as "molded body after dropping") is measured.

Using the following expression (1), the compression aggregation degree is calculated from the ratio of the mass of the molded body after dropping to the mass of the molded body before dropping.

Compression aggregation degree=(Mass of molded body after dropping/Mass of molded body after dropping)×100    Expression (1):

—Particle Compression Ratio—

The particle compression ratio of the specified silica particles is from 0.20 to 0.40 but, from the viewpoints of securing the fluidity and the dispersibility to the toner particles while the aggregating properties and the attaching properties to the toner particles are made good in the specified silica particles (i.e., viewpoints of the charge maintaining properties and suppression of occurrence of filming on the photoreceptor surface), is preferably from 0.24 to 0.38 and more preferably from 0.28 to 0.36.

The particle compression ratio is calculated by the method shown below.

Aerated apparent specific gravity and packed apparent specific gravity of the resin particle are measured using a powder tester (manufactured by Hosokawa Micron Corporation, item number: Pt-S Model). Then, the particle compression ratio is calculated from the ratio of a difference between the packed apparent specific gravity and the aerated apparent specific gravity of silica particles to the packed apparent specific gravity, using the following expression (2).

Particle compression ratio=[(Packed apparent specific gravity)−(Aerated apparent specific gravity)]/(Packed apparent specific gravity)    Expression (2):

Incidentally, the "aerated apparent specific gravity" means a measured value deduced by filling the silica particles into a vessel having a volume of 100 cm$^3$ and weighing it and refers to a filling specific gravity in a state where the specified silica particles are allowed to naturally drop into the vessel. The "packed apparent specific gravity" means an apparent specific gravity resulting from performing deaeration by repeatedly applying impact to vessel bottom (tapping) 180 times at a stroke length of 18 mm and a tapping rate of 50 times/minute from a state of the aerated apparent specific gravity to rearrange and more densely fill the specified silica particles.

—Particle dispersion Degree—

The particle dispersion degree of the specified silica particles is preferably from 90% to 100%, more preferably 95% to 100%, and further preferably 100% from the viewpoint of further improving the dispersibility to the toner particles (i.e., viewpoint of the charge maintaining properties).

The particle dispersion degree is a ratio of the measured coverage C on the toner particles to the calculated coverage $C_0$ and is calculated using the following expression (3).

Particle dispersion degree=Measured coverage $C$/Calculated coverage $C_0$    Expression (3):

Here, the calculated coverage $C_0$ on the toner particle surface with the specified silica particles can be calculated from the following expression (3-1) when the volume average particle diameter of the toner particles is taken as dt (m), the average equivalent circle diameter of the specified silica particles is taken as da (m), the specific gravity of the toner particles is taken as pt, the specific gravity of the specified silica particles is taken as pa, the weight of the toner particles is taken as Wt (kg), and the adding amount of the specified silica particles is taken as Wa (kg).

Calculated coverage $C_0 = \sqrt{3}/(2\pi) \times (pt/pa) \times (dt/da) \times (Wa/Wt) \times 100(\%)$    Expression (3-1):

The measured coverage C on the toner particle surface with the specified silica particles can be calculated from the following expression (3-2) after measuring signal intensities of the silicon atom derived from the specified silica particles for the toner particles alone, the specified silica particles alone, and the toner particles covered (attached) with the specified silica particles on an X-ray photoelectron spectroscope (XPS) ("JPS-9000MX": manufactured by JEOL Ltd.).

Measured coverage $C=(z-x)/(y-x)\times100(\%)$    Expression (3-2):

(In the expression (3-2), x represents a signal intensity of the silicon atom derived from the specified silica particles of the toner particles alone. y represents a signal intensity of the silicon atom derived from the specified silica particles of the specified silica particles alone. z is a signal intensity of the silicon atom derived from the specified silica particles of the toner particles coated (attached) with the specified silica particles)

—Average Equivalent circle Diameter—

The average equivalent circle diameter of the specified silica particles is preferably from 40 nm to 200 nm, more preferably from 50 nm to 180 nm, and further preferably from 60 nm to 160 nm from the viewpoint of improving the fluidity, the dispersibility to the toner particles, the aggregating properties, and the attaching properties to the toner particles (particularly, viewpoints of the charge maintaining properties and suppression of the generation of filming on the photoreceptor surface).

With regard to the average equivalent circle diameter D50 of the specified silica particles, primary particles after the specified silica particles are externally added to the toner particles are observed on a scanning electron microscope SEM (Scanning Electron Microscope) apparatus (manufactured by Hitachi, Ltd.: S-4100) and images are photographed. Then, the images are captured into an image analyzer (LUZEXIII, manufactured by NIRECO Corporation), area per each particle is measured by image analysis of the primary particles, and the equivalent circle diameter is calculated from the area value. The 50% diameter (D50) in a cumulative frequency on the volume basis of the obtained equivalent circle diameter is defined as the equivalent circle diameter D50 of the specified silica particles. Incidentally, the magnitude of the electron microscope is controlled so that from about 10 to 50 pieces of the specified silica particles are observed in one viewing field and the equivalent circle diameter of the primary particles is determined with summarizing the observation of a plurality of the viewing fields.

Incidentally, when the specified silica particles are too large with respect to the toner particles, the specified silica particles are hard to be attached to the toner particles and there is a tendency that the specified silica particles are prone to be released from the toner particles. On the other hand, when the specified silica particles are too small with respect to the toner particles, the spacer function as the external additive tends to decrease. From the viewpoints that the specified silica particles are easily attached to the toner particles and the specified silica particles exhibit a spacer function as the external additive and are hard to be released from the toner particles, the ratio of the average equivalent circle diameter of the specified silica particles to the volume average particle diameter of the toner particles (Average equivalent circle diameter of the specified silica particles/Volume average particle diameter of the toner particles) is preferably from 0.005 to 0.05 and more preferably from 0.005 to 0.04.

—Average Circularity—

The shape of the specified silica particles may be either a spherical shape or a variant shape but, from the viewpoint of improving the fluidity, the dispersibility to the toner particles, the aggregating properties, and the attaching properties to the toner particles in the specified silica particles (particularly, viewpoints of the charge maintaining properties and suppression of the occurrence of filming on the photoreceptor surface), the average circularity of the specified silica particles is preferably from 0.85 to 0.98, more preferably from 0.90 to 0.98, and further preferably from 0.93 to 0.98.

The average circularity of the specified silica particles is measured by the method shown below.

First, the average circularity of the specified silica particles is obtained as "100/SF2" resulting from observation of the primary particles after silica particles are externally added to the toner particles on an SEM apparatus and calculation from the obtained plane image analysis of the primary particles according to the following expression.

$$\text{Circularity } (100/SF2) = 4\pi \times (A/I^2)$$ Expression:

wherein I represents a circumferential length of the primary particles on the image, and A represents a projected area of the primary particles.

The average circularity of the specified silica particles is obtained as 50% circularity in a cumulative frequency of circularities of 100 primary particles obtained by the foregoing plane image analysis.

Here, there will be described a method of measuring individual characteristics (compression aggregation degree, particle compression ratio, particle dispersion degree, average circularity) of the specified silica particles.

First, the external additive (specified silica particles) is separated from the toner as follows. The toner is charged into methanol and they are well mixed by stirring. Then, the specified silica particles are released from the toner surface by the treatment in a bath-type ultrasonic disperser and, after the treatment, the toner component is precipitated by centrifugation. Only a methanol supernatant containing the specified silica particles dispersed therein is collected and the specified silica particles can be obtained by distilling away methanol alone.

Then, the above individual characteristics are measured using the separated specified silica particles.

Hereinafter, the configuration of the specified silica particles will be described in detail.

—Specified Silica Particles—

The specific silica particles are particles composed of silica (i.e., $SiO_2$) as the main component, and may be crystalline or amorphous. The specified silica particles may be particles produced using, as a raw material, a silicon compound such as water glass and alkoxysilane or may be particles obtained by pulverizing quartz.

Specifically, the specific silica particles include silica particles prepared by a sol-gel method (sol-gel silica particles), aqueous colloidal silica particles, alcoholic silica particles, fumed silica particles obtained by a gas phase process, and fused silica particles. Among these, sol-gel silica particles are preferred.

—Surface Treatment—

In order to control the compression aggregation degree, the particle compression ratio, and the particle dispersion degree to the above specific ranges, the specified silica particles are preferably surface-treated with a siloxane compound.

As a surface treatment method, it is preferable to subject the surface of silica particles to a surface treatment in supercritical carbon dioxide utilizing supercritical carbon dioxide. Incidentally, the surface treatment method will be mentioned later.

—Siloxane Compound—

The siloxane compound is not particularly limited as long as it has a siloxane skeleton in the molecular structure.

Examples of the siloxane compound include silicone oils and silicone resins. Of these, from the viewpoint of a surface treatment of silica particle surface in a nearly homogeneous state, silicone oils are preferred.

Examples of the silicone oil include dimethylsilicone oil, methylhydrogensilicone oil, methylphenylsilicone oil, amino-modified silicone oil, epoxy-modified silicone oil, carboxyl-modified silicone oil, carbinol-modified silicone oil, methacryl-modified silicone oil, mercapto-modified silicone oil, phenol-modified silicone oil, polyether-modified silicone oil, methylstyryl-modified silicone oil, alkyl-modified silicone oil, higher fatty acid ester-modified silicone oil, higher fatty acid amide-modified silicone oil, fluorine-modified silicone oil, and the like. Of these, dimethylsilicone oil, methylhydrogensilicone oil, and amino-modified silicone oil are preferred.

The siloxane compounds may be used alone or two or more kinds thereof may be used in combination.

—Viscosity—

From the viewpoint of improving the fluidity, the dispersibility to the toner particles, the aggregating properties, and the attaching properties to the toner particles in the specified silica particles (particularly, viewpoints of the charge maintaining properties and suppression of the occurrence of filming on the photoreceptor surface), the viscosity (dynamic viscosity) of the siloxane compound is preferably from 1,000 cSt to 50,000 cSt, more preferably from 2,000 cSt to 30,000 cSt, and further preferably from 3,000 cSt to 10,000 cSt.

The viscosity of the siloxane compound is determined by the following procedures. Toluene is added to the specified silica particles and it is dispersed in an ultrasonic dispersing device for 30 minutes. Thereafter, a supernatant is collected. On this occasion, there is formed a toluene solution containing the siloxane compound having a concentration of 1 g/100 ml. Specific viscosity $[\eta_{sp}]$ (25° C.) at this time is determined according to the following expression (A).

$$\eta_{sp}=(\eta/\eta_0)-1 \qquad \text{Expression (A):}$$

($\eta_0$: viscosity of toluene, $\eta$: viscosity of solution)

Then, the specific viscosity $[\eta_{sp}]$ is substituted in the Huggins relational expression shown by the following expression (B) to determine intrinsic viscosity $[\eta_1]$.

$$\eta_{sp}=[\eta]+K'[\eta]^2 \qquad \text{Expression (B):}$$

(K': Huggins constant, K'=0.3 (at the time of applying [η]=1 to 3)

Next, the intrinsic viscosity $[\eta_1]$ is substituted in the A. Kolorlov expression represented by the following expression (C) to determine molecular weight M.

$$[\eta]=0.215\times10^{-4}M^{0.65} \qquad \text{Expression (C):}$$

The molecular weight M is substituted in the expression of A. J. Barry shown by the following expression (D) to determine siloxane viscosity [η].

$$\log \eta=1.00+0.0123M^{0.5} \qquad \text{Expression (D):}$$

—Surface Attaching Amount—

From the viewpoint of improving the fluidity, the dispersibility to the toner particles, the aggregating properties, and the attaching properties to the toner particles in the specified silica particles (particularly, viewpoints of the charge maintaining properties and suppression of the occurrence of filming on the photoreceptor surface), the surface attaching amount of the siloxane compound to the surface of the specified silica particles is preferably from 0.01% by mass to 5% by mass, more preferably from 0.05% by mass to 3% by mass, and further preferably from 0.10% by mass to 2% by mass based on the silica particles (silica particles before the surface treatment).

The surface attaching amount is measured by the method shown below.

The specified silica particles (100 mg) is dispersed in 1 mL of chloroform and, after 1 μL of DMF (N,N-dimethylformamide) is added thereto as an internal standard liquid, an ultrasonic treatment is performed in an ultrasonic washing machine for 30 minutes and extraction of the siloxane compound into a chloroform solvent is performed. Thereafter, hydrogen nucleus spectrum measurement is conducted on a JNM-AL400 type nuclear magnetic resonance apparatus (manufactured by JEOL Ltd. DATUM) and the amount of the siloxane compound is obtained from the ratio of the peak area derived from the siloxane compound to the peak area derived from DMF. Then, the surface attaching amount is obtained from the amount of the siloxane compound.

Here, it is preferable that the specified silica particles are surface-treated with a siloxane compound having a viscosity of from 1,000 cSt to 50,000 cSt and the surface attaching amount of the siloxane compound to the silica particle surface is from 0.01% by mass to 5% by mass.

When the above requirements are satisfied, there are easily obtained the specified silica particles having good fluidity and dispersibility to the toner particles and exhibiting improved aggregating properties and attaching properties to the toner particles.

—External Addition Amount—

The external addition amount (content) of the specified silica particles is preferably from 0.1% by mass to 6.0% by mass, more preferably from 0.2% by mass to 4.0% by mass, and further preferably from 0.3% by mass to 3.0% by mass from the viewpoints of the charge maintaining properties and suppression of the occurrence of filming on the photoreceptor surface.

[Production Method of Specified Silica Particles]

The specified silica particles are obtained by surface-treating the surface of silica particles with a siloxane compound having a viscosity of from 1,000 cSt to 50,000 cSt so that the surface attaching amount of the siloxane compound to the silica particle surface becomes from 0.01% by mass to 5% by mass.

According to the production method of the specified silica particles, there are obtained silica particles having good fluidity and dispersibility to the toner particles and exhibiting improved aggregating properties and attaching properties to the toner particles.

As the surface treatment method, there may be mentioned a method of surface-treating the surface of silica particles with the siloxane compound in supercritical carbon dioxide; and a method of surface-treating the surface of silica particles with a siloxane compound in the air.

As the surface treatment method, specifically, there may be, for example, mentioned a method of dissolving the siloxane compound in supercritical carbon dioxide utilizing supercritical carbon dioxide and attaching the siloxane compound to the silica particle surface; a method of imparting (e.g., spraying or applying) a solution containing the siloxane compound and a solvent that dissolves the siloxane compound to the silica particle surface in the air to attach the siloxane compound to the silica particle surface; and a method of adding a solution containing the siloxane compound and a solvent that dissolves the siloxane compound to a silica particle dispersion, holding the whole, and subsequently drying the mixed solution of the silica particle dispersion and the above solution in the air.

Of these, as the surface treatment method, preferred is the method of attaching the siloxane compound to the silica particle surface utilizing supercritical carbon dioxide.

When the surface treatment is performed in the supercritical carbon dioxide, there is obtained a state that the siloxane compound is dissolved in the supercritical carbon dioxide. Since the supercritical carbon dioxide has a characteristic of a low surface tension, it is considered that the siloxane compound in a state that it is dissolved in the supercritical carbon dioxide is prone to diffuse into and arrive at a deep portion of pore parts on the surface of the silica particles together with the supercritical carbon dioxide and thus it is considered that the surface treatment with the siloxane compound is achieved not only on the silica particle surface but also to a deep end of the pore parts.

For this reason, it is considered that the silica particles surface-treated with the siloxane compound in the supercritical carbon dioxide become silica particles where the surface is treated with the siloxane compound in a nearly homogeneous state (e.g., a state that a surface treatment layer is formed in a thin-film form).

Moreover, in the production method of the specified silica particles, there may be performed a surface treatment of imparting hydrophobicity to the surface of silica particles using a hydrophobilizing agent together with the siloxane compound in the supercritical carbon dioxide.

In this case, there is obtained a state that the hydrophobilizing agent is dissolved together with the siloxane compound in the supercritical carbon dioxide. It is considered that the siloxane compound and the hydrophobilizing agent in a state that they are dissolved in the supercritical carbon dioxide are prone to diffuse into and arrive at a deep portion of pore parts on the surface of the silica particles together with the supercritical carbon dioxide and thus it is considered that the surface treatment with the siloxane compound and the hydrophobilizing agent is achieved not only on the silica particle surface but also to a deep end of the pore parts.

As a result, in the silica particles surface-treated with the siloxane compound and the hydrophobilizing agent in the supercritical carbon dioxide, the surface is treated with the siloxane compound and the hydrophobilizing agent in a nearly homogeneous state and also a high hydrophobicity is easily imparted.

Furthermore, in the production method of the specified silica particles, supercritical carbon dioxide may be utilized in other production process of the silica particles (e.g., a solvent removal step and the like).

As a production method of the specified silica particles utilizing the supercritical carbon dioxide in the other production process, for example, there may be mentioned a production method of silica particles having a step of preparing a silica particle dispersion containing silica particles and a solvent containing an alcohol and water by a sol-gel method (hereinafter referred to as "dispersion preparation step"), a step of circulating the supercritical carbon dioxide supercritical carbon dioxide and thereby removing the solvent from the silica particle dispersion (hereinafter referred to as "solvent removal step"), and a step of surface-treating the surface of the silica particles after removal of the solvent with a siloxane compound in the supercritical carbon dioxide (hereinafter referred to as "surface treatment step").

When the solvent removal from the silica particle dispersion is performed utilizing the supercritical carbon dioxide, generation of a coarse powder can be easily suppressed.

Although the reason is not clear, the following points are considered as reasons: 1) in the case where the solvent is removed from the silica particle dispersion, it is considered that the solvent can be removed without aggregation of the particles themselves that may be caused by liquid crosslinking force at the time of removing the solvent, owing to the property that "surface tension does not work" in the supercritical carbon dioxide, 2) it is considered that the solvent in the silica particle dispersion can be removed by removing the supercritical carbon dioxide containing the solvent dissolved therein without generating a coarse powder of secondary aggregate or the like formed by condensation of the silanol groups since the solvent efficiently comes into contact with the supercritical carbon dioxide and is dissolved therein at a relatively low temperature (e.g., 250° C. or lower), owing to the property of the supercritical carbon dioxide that "it is carbon dioxide in a state under temperature and pressure equal to or higher than critical points and has both of diffusivity as a gas and solubility as a liquid".

Here, the solvent removal step and the surface treatment step may be performed separately but are preferably performed successively (that is, the steps are carried out in a state that the steps are not opened to the atmospheric pressure). When these steps are successively performed, the surface treatment step can be conducted in a state that excessive water adsorption to the silica particles is suppressed without any chance that the silica particles adsorb water after the solvent removal step. Thereby, it is not necessary to perform the solvent removal step and the surface treatment step with using a large amount of the siloxane compound and at a high temperature with conducting excessive heating. As a result, the generation of a coarse powder is easily suppressed more effectively.

Hereinafter, details of the production method of the specified silica particles will be described for respective steps in detail.

Incidentally, the production method of the specified silica particles is not limited thereto and may be, for example, 1) an exemplary embodiment where supercritical carbon dioxide is used only in the surface treatment step or 2) an exemplary embodiment where the steps are separately performed.

Hereinafter, each step will be described in detail.

—Dispersion Preparation Step—

In the dispersion preparation step, for example, a silica particle dispersion containing silica particles and a solvent containing an alcohol and water is prepared.

Specifically, in the dispersion preparation step, for example, a silica particle dispersion is manufactured by a wet process (e.g., a sol-gel method or the like) and it is prepared. Particularly, the silica particle dispersion is suitably manufactured by the sol-gel method as a wet process, specifically by causing reactions (hydrolysis reaction, condensation reaction) of a tetraalkoxysilane in a solvent of an alcohol and water in the presence of an alkali catalyst to form silica particles.

Incidentally, a preferable range of the average equivalent circle diameter of silica particles and a preferable range of the average circularity thereof are as mentioned above.

In the dispersion preparation step, for example, in the case where silica particles are obtained by the wet process, it is obtained in a dispersion (silica particle dispersion) state where the silica particles are dispersed in a solvent.

Here, at the transfer to the solvent removal step, in the silica particle dispersion to be prepared, the mass ratio of water to the alcohol is, for example, from 0.05 to 1.0, preferably from 0.07 to 0.5, and more preferably from 0.1 to 0.3.

In the silica particle dispersion, when the mass ratio of water to the alcohol is controlled to the above range, the generation of a coarse powder of the silica particles is a little after the surface treatment and silica particles having a good electric resistance are easily obtained.

When the mass ratio of water to the alcohol is less than 0.05, in the solvent removal step, since condensation of the silanol groups on the silica particle surface decreases at the time of removing the solvent, adsorbed water onto the silica particle surface after solvent removal increases, so that the electric resistance of the silica particles after the surface treatment becomes too low in some cases. Moreover, when the mass ratio of the water exceeds 1.0, in the solvent removal step, much water remains at around the end point of the solvent removal in the silica particle dispersion and aggregation of the silica particles themselves owing to liquid crosslinking force is prone to occur, so that they sometimes exist as a coarse powder after the surface treatment.

Moreover, at the transfer to the solvent removal step, in the silica particle dispersion to be prepared, the mass ratio of water to the silica particles is, for example, from 0.02 to 3, preferably from 0.05 to 1, and more preferably from 0.1 to 0.5.

In the silica particle dispersion, when the mass ratio of water to the silica particles is controlled to the above range, the generation of a coarse powder of the silica particles is a little and silica particles having a good electric resistance are easily obtained.

When the mass ratio of water to the silica particles is less than 0.02, in the solvent removal step, since condensation of the silanol groups on the silica particle surface extremely decreases at the time of removing the solvent, adsorbed water onto the silica particle surface after solvent removal increases, so that the electric resistance of the silica particles after the surface treatment becomes too low in some cases.

Moreover, when the mass ratio of the water exceeds 3, in the solvent removal step, much water remains at around the end point of the solvent removal in the silica particle dispersion and aggregation of the silica particle themselves owing to liquid crosslinking force is prone to occur in some cases.

Furthermore, at the transfer to the solvent removal step, in the silica particle dispersion to be prepared, the mass ratio of the silica particles to the silica particle dispersion is, for example, from 0.05 to 0.7, preferably from 0.2 to 0.65, and more preferably from 0.3 to 0.6.

When the mass ratio of the silica particles to the silica particle dispersion is less than 0.05, in the solvent removal step, the amount of the supercritical carbon dioxide increases and productivity gets worse in some cases.

Moreover, when the mass ratio of the silica particles to the silica particle dispersion exceeds 0.7, in the silica particle dispersion, distance between silica particles decreases and a coarse powder resulting from aggregation and gelation of the silica particles tends to be generated in some cases.

—Solvent Removal Step—

The solvent removal step is, for example, a step of circulating the supercritical carbon dioxide and thereby removing the solvent of the silica particle dispersion.

That is, the solvent removal step is a step where, by circulating the supercritical carbon dioxide, the supercritical carbon dioxide is brought into contact with the silica particle dispersion to remove the solvent.

Specifically, in the solvent removal step, for example, the silica particle dispersion is charged into a tightly sealed reactor. Thereafter, liquefied carbon dioxide is added into the tightly sealed reactor, the whole is heated, pressure in the reactor is elevated by a high-pressure pump to make carbon dioxide a supercritical state. The supercritical carbon dioxide is introduced into the tightly sealed reactor tightly sealed reactor and also discharged, thus circulating the supercritical carbon dioxide into the tightly sealed reactor, i.e., through the silica particle dispersion.

Thereby, the supercritical carbon dioxide dissolves the solvent (the alcohol and water) and also is discharged together with it into the outside of the silica particle dispersion (outside of the tightly sealed reactor) and thus the solvent is removed.

Here, the supercritical carbon dioxide is carbon dioxide in a state where it is placed under temperature and pressure equal to or higher than the critical point and has diffusibility as a gas and solubility as a liquid.

Temperature condition for solvent removal, i.e., temperature of the supercritical carbon dioxide is, for example, from 31° C. to 350° C., preferably from 60° C. to 300° C., and more preferably from 80° C. to 250° C.

When the temperature is less than the above range, the solvent is less prone to dissolve in the supercritical carbon dioxide, so that it becomes hard to remove the solvent. Moreover, it is considered that a coarse powder is easily generated due to the liquid crosslinking force of the solvent and the supercritical carbon dioxide in some cases. On the other hand, when the temperature exceeds the above range, it is considered that a coarse powder of secondary aggregate or the like resulting from condensation of silanol groups on the silica particle surface is easily generated in some cases.

Pressure condition for solvent removal, i.e., pressure of the supercritical carbon dioxide is, for example, from 7.38 MPa to 40 MPa, preferably from 10 MPa to 35 MPa, and more preferably from 15 MPa to 25 MPa.

When the pressure is less than the above range, there is a tendency that the solvent is less prone to dissolve in the supercritical carbon dioxide and, on the other hand, when the pressure exceeds the above range, the facility tends to be expensive.

Moreover, the introducing/discharging amount of the supercritical carbon dioxide is, for example, from 15.4 L/minute/$m^3$ to 1,540 L/minute/$m^3$, preferably 77 L/minute/$m^3$ to 770 L/minute/$m^3$.

When the introducing/discharging amount is less than 15.4 L/minute/$m^3$, the solvent removal takes time, so that there is a tendency that productivity is prone to be worse.

On the other hand, the introducing/discharging amount exceeds 1,540 L/minute/$m^3$, the supercritical carbon dioxide makes short pass and thus contact time with the silica particle dispersion is shortened, so that efficient solvent removal tends to be difficult.

—Surface Treatment Step—

The surface treatment step is, for example, a step of surface-treating the surface of the silica particles with the siloxane compound in the supercritical carbon dioxide successively from the solvent removal step.

That is, in the surface treatment step, for example, prior to the transfer from the solvent removal step, opening to the air is not performed and the surface of the silica particles is surface-treated with the siloxane compound in the supercritical carbon dioxide.

Specifically, in the surface treatment step, for example, after the introduction/discharge of the supercritical carbon dioxide into the tightly sealed reactor in the solvent removal step is stopped, the temperature and pressure in the tightly sealed reactor are adjusted and the siloxane compound in a certain ratio with respect to the silica particles is charged into the tightly sealed reactor in a state that the supercritical carbon dioxide is present. Then, the siloxane compound is reacted in a state that the above state is maintained, that is, in the supercritical carbon dioxide to perform the surface treatment of the silica particles.

Here, in the surface treatment step, it is sufficient to carry out the reaction of the siloxane compound in the supercritical carbon dioxide (i.e., under an atmosphere of the supercritical carbon dioxide), and the surface treatment may be conducted while the supercritical carbon dioxide is circulated (i.e., the supercritical carbon dioxide is introduced into the tightly sealed reactor and discharged therefrom) or the surface treatment may be conducted while it is not circulated.

In the surface treatment step, the amount of the silica particles (i.e., charging amount) with respect to the volume of the reactor is, for example, from 30 g/L to 600 g/L. preferably from 50 g/L to 500 g/L, and more preferably from 80 g/L to 400 g/L.

When the amount is less than the above range, the concentration of the siloxane compound to the supercritical carbon dioxide decreases and the contact probability with the silica surface decreases, so that the reaction is less prone to proceed in some cases. On the other hand, when the amount is more than the above range, the concentration of the siloxane compound to the supercritical carbon dioxide increases and the siloxane compound does not completely dissolve in the supercritical carbon dioxide to result in insufficient dispersion, so that coarse aggregates are easily generated.

The density of the supercritical carbon dioxide is, for example, suitably from 0.10 g/ml to 0.80 g/ml, preferably from 0.10 g/ml to 0.60 g/ml, and more preferably from 0.20 g/ml to 0.50 g/ml.

When the density is lower than the above range, the solubility of the siloxane compound in the supercritical carbon dioxide decreases and aggregates tend to be generated. On the other hand, when the density is higher than the above range, the diffusivity to the silica fine pores decreases, so that the surface treatment sometimes becomes insufficient. Particularly, for sol-gel silica particles containing many silanol groups, it is suitable to perform the surface treatment in the above density range.

Incidentally, the density of the supercritical carbon dioxide is adjusted depending on temperature, pressure, and the like.

Specific examples of the siloxane compound are as mentioned above. Moreover, a preferable range of the viscosity of the siloxane compound is also as mentioned previously.

Of the siloxane compounds, when a silicone oil is applied, the silicone oil is easily attached to the silica particle surface in a nearly homogeneous state and thus the fluidity, dispersibility, and handling properties of the silica particles are easily improved.

The amount of the siloxane compound to be used is, for example, suitably from 0.05% by mass to 3% by mass, preferably from 0.1% by mass to 2% by mass, and more preferably from 0.15% by mass to 1.5% by mass from the viewpoint that the surface attaching amount to the silica particles is easily controlled to from 0.01% by mass to 5% by mass.

Incidentally, the siloxane compound may be used solely or may be used as a mixed liquid with a solvent in which the siloxane compound easily dissolves. Examples of the solvent include toluene, methyl ethyl ketone, and methyl isobutyl ketone.

In the surface treatment step, the surface treatment of the silica particles may be performed with a mixture containing a hydrophobilizing agent together with the siloxane compound.

Examples of the hydrophobilizing agent include silane-based hydrophobilizing agents. As the silane-based hydrophobilizing agents, there may be mentioned known silicon compounds having an alkyl group (e.g., a methyl group, an ethyl group, a propyl group, a butyl group, etc.). Specific examples thereof include silazane compounds (e.g., silane compounds such as methyltrimethoxysilane, dimethyldimethoxysilane, trimethylchlorosilane, and trimethylmethoxysilane, hexamethyldisilazane, tetramethyldisilazane, etc.) and the like. The hydrophobilizing agent may be used solely or plural kinds thereof may be used in combination.

Of the silane-based hydrophobilizing agents, silicon compounds having a trimethyl group, such as trimethylmethoxysilane and hexamethyldisilazane (HMDS), particularly hexamethyldisilazane (HMDS) are suitable.

The amount of the silane-based hydrophobilizing agent to be used is not particularly limited but is, for example, suitably from 1% by mass to 100% by mass, preferably from 3% by mass to 80% by mass, and more preferably from 5% by mass to 50% by mass based on silica particles.

Incidentally, the silane-based hydrophobilizing agent may be used solely or may be used as a mixed liquid with a solvent in which the silane-based hydrophobilizing agent easily dissolves. Examples of the solvent include toluene, methyl ethyl ketone, and methyl isobutyl ketone.

Temperature condition for the surface treatment, i.e., temperature of the supercritical carbon dioxide is, for example, suitably from 80° C. to 300° C., preferably from 100° C. to 250° C., and more preferably from 120° C. to 200° C.

When the temperature is less than the above range, the surface treatment ability with the siloxane compound decreases in some cases. On the other hand, when the temperature exceeds the above range, a condensation reaction between the silanol groups of the silica particles proceeds and particle aggregation may be generated. Particularly, for sol-gel silica particles containing many silanol groups, it is suitable to perform the surface treatment in the above temperature range.

On the other hand, pressure condition for the surface treatment, i.e., pressure of the supercritical carbon dioxide, is sufficiently a condition satisfying the above density but is, for example, suitably from 8 MPa to 30 MPa, preferably from 10 MPa to 25 MPa, and more preferably from 15 MPa to 20 MPa.

Through individual steps described above, the specified silica particles are obtained.

[Medium-Resistance Particles]

Medium-resistance particles are inorganic oxide particles having a volume resistivity of from $1.0 \times 10^8$ Ωcm to $1.0 \times 10^{15}$ Ωcm. The volume resistivity of the medium-resistance particles is suitably from $1.0 \times 10^{10}$ Ωcm to $1.0 \times 10^{15}$ Ωcm in view of a blance between charge imparting ability and charge leakage.

The volume resistivity of the medium-resistance particles is measured by the method shown below. Incidentally, the measurement environment is a temperature of 20° C. and a humidity of 50% RH.

Medium-resistance particles to be a measurement target are placed on the surface of a circular jig having an electrode plate of 20 cm$^2$ so as to be a thickness ranging from 1 mm to 3 mm to form a medium-resistance particle layer. An electrode plate of 20 cm$^2$ the same as that mentioned above is placed on the medium-resistance particle layer to sandwich the medium-resistance particle layer. In order to eliminate any space between the medium-resistance particles, a load of 4 kg is applied onto the electrode plate placed on the medium-resistance particle layer and subsequently the thickness (cm) of the medium-resistance particle layer is measured. Incidentally, both electrodes present on and under the medium-resistance particle layer are connected to an electrometer and a high-voltage electric source generator. A high voltage is applied to the both electrodes so that the electric field becomes 6,000 V/cm and the volume electric resistance (Ωcm) of the medium-resistance particles is calculated by reading out an electric current value (A) flowing at this time. A calculation expression of the volume resistivity (Ωcm) of a carrier is as shown by the following expression.

$$R = E \times 20/(I-I_0)/L \qquad \text{Expression:}$$

In the above expression, R is volume resistivity (Ωcm) of medium-resistance particles, E is applied voltage (V), I is the electric current value (A), $I_0$ is an electric current value (A) at an applied voltage of 0 V, and L is thickness (cm) of the medium-resistance particle layer, respectively. Moreover, the coefficient 20 represents area (cm$^2$) of the electrode plate.

As the medium-resistance particles, there may be mentioned titanium oxide particles, aluminum oxide particles, zinc oxide particles, and the like. Of these, as the medium-resistance particles, preferred are titanium oxide particles (titania particles) that suppress charging environment dependency (variation of a charging amount under high-temperature and high-humidity/low-temperature and low-humidity) of a toner.

Examples of the titanium oxide particles include anatase titanium oxide particles, rutile titanium oxide particles, metatitanic acid particles, and the like and any of them may be used.

Incidentally, metatitanic acid means one of titanic acid hydrates $TiO_2 \cdot nH_2O$ where n is 1. The titanic acid particles are usually purified by a wet process where a chemical reaction is performed in a solvent. The wet process is classified into a sulfuric acid method and a hydrochloric acid method. In the sulfuric acid method, $TiOSO_4$ is formed by the proceeding of the reaction of $FeTiO_3$ and $2H_2SO_4$ and metatitanic acid $(TiO(OH)_2)$ particles are obtained by hydrolysis of the formed $TiOSO_4$. On the other hand, in the hydrochloric acid method, first, chlorination is performed in the same manner as in a dry process to form titanium tetrachloride. Thereafter, it is dissolved in water and metatitanic acid $(TiO(OH)_2)$ particles are obtained by hydrolysis while a strong base is added thereto.

The average equivalent circle diameter of the medium-resistance particles is smaller than that of the specified silica particles and is, for example, preferably from 7 nm to 50 nm and more preferably from 7 nm to 40 nm.

Incidentally, the average equivalent circle diameter D50 of the medium-resistance particles is measured by the same method as the measurement method of the average equivalent circle diameter D50 of the specified silica particles.

Here, there will be described a method of measuring individual characteristics (volume resistivity, average equivalent circle diameter, etc.) of the medium-resistance particles from a toner.

First, following the same method as the method of measuring the individual characteristics of the specified silica particles, the external additive is separated from the toner. Then, using the separated medium-resistance particles, the above characteristics (volume resistivity, average equivalent circle diameter, etc.) are measured.

The medium-resistance particle may be subjected to a hydrophobilizing treatment. The hydrophobilizing treatment is performed, for example, by dipping the titania particle in a hydrophobilizing agent. The hydrophobilizing agent used for the hydrophobilizing treatment includes, for example, silane coupling agents and silicone oils.

Examples of the silane coupling agent include hexamethyldisilazane, trimethylsilane, trimethylchlorosilane, dimethyldichlorosilane, methyltrichlorosilane, allyldimethylchlorosilane, benzyldimethylchlorosilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-butyltrimethoxysilane, n-hexadecyltrimethoxysilane, n-octadecyltrimethoxysilane, vinyltrimethoxysilane, vinyltriethoxysilane, γ-methacryloxypropyltrimethoxysilane, and vinyltriacetoxysilane.

Examples of the silicone oil include dimethylpolysiloxane, methylhydrogenpolysiloxane, and methylphenylpolysiloxane.

Incidentally, the hydrophobilizing agent also includes known hydrophobilizing agents such as titanate coupling agents and aluminum coupling agents.

The hydrophobilizing agents may be used alone or two or more kinds thereof may be used in combination.

The externally addition amount (adding amount) of the medium-resistance particles is, for example, preferably from 0.1% by mass to 4.0% by mass, and more preferably from 0.3% by mass to 2.0% by mass, based on the total mass of the toner particles.

[Other External Additive]

Examples of other external additive include inorganic particles. Examples of the inorganic particles include $SiO_2$ (excluding the specified silica particles), $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O-(TiO_2)n$, $Al_2O_3 \cdot 2SiO_2$, $CaCO_3$, $MgCO_3$, $BaSO_4$, and $MgSO_4$.

Surfaces of the inorganic particles as the other external additive are preferably subjected to a hydrophobilizing treatment. The hydrophobilizing treatment is performed by, for example, dipping the inorganic particles in a hydrophobilizing agent. The hydrophobilizing agent is not particularly limited and examples thereof include a silane coupling agent, silicone oil, a titanate coupling agent, and an aluminum coupling agent. These may be used alone or two or more kinds thereof may be used in combination.

Generally, the amount of the hydrophobilizing agent is, for example, from 1 part by mass to 30 parts by mass with respect to 100 parts by mass of the inorganic particles.

Examples of the other external additive also include resin particles (resin particles such as polystyrene, polymethyl methacrylate (PMMA), and melamine resin particles) and a cleaning aid (e.g., metal salt of a higher fatty acid represented by zinc stearate, and fluorine polymer particles).

The amount of the external additives externally added is, for example, preferably from 0% by mass to 10% by mass, and more preferably from 0% by mass to 3% by mass with respect to the toner particles.

(Production Method of Toner)

Next, a method of producing a toner according to the exemplary embodiment will be described.

The toner according to the exemplary embodiment is obtained by externally adding an external additive to toner particles after production of the toner particles.

The toner particles may be produced using any of a dry method (e.g., kneading and pulverizing method) and a wet method (e.g., an aggregation and coalescence method, a suspension polymerization method, and a dissolution and suspension method). The toner particle production method is not particularly limited to these production methods, and a known production method is employed.

In the toner according to the exemplary embodiment, the toner particles are preferably toner particles produced by an aggregation and coalescence method (hereinafter also referred to as "aggregation and coalescence toner particles") from the viewpoint that aforementioned preferable average circularity and volume average particle diameter are easily satisfied.

The aggregation and coalescence toner particles easily afford the above preferable average circularity and volume average particle diameter and furthermore toner particles having narrow particle size distribution are easily produced. Therefore, toner images having high resolution can be formed by using the aggregation and coalescence toner particles.

On the other hand, as an external addition structure of the toner, in general, as the toner particles decrease in size and as the circularity increases (nearer to true sphere), the external additive tends to be released. Even when the average circularity and the volume average particle diameter are the same, the toner frequently has different form and properties depending on the shape and/or wide or narrow particle size distribution. The aggregation and coalescence method easily affords a narrow particle size distribution as mentioned above but, owing to the production method of aggregating small particles to achieve particle size control and controlling the shape from a distorted shape into a spherical shape, principally, particles having a small particle diameter and a round shape are relatively prone to exist. Furthermore, in the case of a toner having a small volume average particle diameter, the tendency may become more remarkable. Therefore, even in the case of toner particles having an average circularity and a volume average particle diameter satisfying the above preferable ranges, which are easy to produce by the aggregation and coalescence method, when the specified silica particles are contained as an external additive, the specified silica particles are hard to release from the toner particles and, even when released, the escape is suppressed by aggregation at the cleaning part. Therefore, the toner according to the exemplary embodiment is excellent in the charge maintaining properties and the generation of filming to be generated on the photoreceptor surface when images are repeatedly formed is effectively suppressed, even in the case of using toner particles having a small particle diameter and a high circularity, which are easy to produce by the aggregation and coalescence method.

Specifically, for example, when the toner particles are produced by an aggregation and coalescence method, the toner particles are produced through a step of preparing a resin particle dispersion in which resin particles as a binder resin are dispersed (resin particle dispersion preparation step); a step of aggregating the resin particles (if necessary, other particles) in the resin particle dispersion (if necessary, in the dispersion after mixing with other particle dispersions) to form aggregated particles (aggregated particle forming step); and a ste of heating the aggregated particle dispersion in which the aggregated particles are dispersed, to fuse and coalesce the aggregated particles, thereby forming toner particles (fusion and coalescence step).

Hereinafter, the respective steps will be described in detail.

In the following description, a method of obtaining toner particles containing a colorant and a release agent will be described, but the colorant and the release agent are only used if necessary. Additives other than the colorant and the release agent may also be used.

—Resin Particle Dispersion Preparation Step—

First, for example, a colorant particle dispersion in which colorant particles are dispersed and a release agent particle dispersion in which release agent particles are dispersed are prepared together with a resin particle dispersion in which resin particles as a binder resin are dispersed.

Here, the resin particle dispersion is prepared by, for example, dispersing resin particles in a dispersion medium with a surfactant.

Examples of the dispersion medium to be used for the resin particle dispersion include aqueous mediums.

Examples of the aqueous mediums include water such as distilled water and ion exchange water, and alcohols. These may be used alone or two or more kinds thereof may be used in combination.

Examples of the surfactant include anionic surfactants such as sulfate salt-based, sulfonate salt-based, phosphate ester-based, and soap-based ones; cationic surfactants such as amine salt type and quaternary ammonium salt type ones; and nonionic surfactants such as polyethylene glycol-based, alkyl phenol ethylene oxide adduct-based, and polyhydric alcohol-based ones. Among these, anionic surfactants and cationic surfactants are particularly mentioned. Nonionic surfactants may be used in combination with anionic surfactants or cationic surfactants.

The surfactants may be used alone or two or more kinds thereof may be used in combination.

Regarding the resin particle dispersion, as a method of dispersing the resin particles in the dispersion medium, a common dispersing method using, for example, a rotary shearing-type homogenizer, or a ball mill, a sand mill, or a Dyno mill having media is exemplified. Depending on the kind of the resin particles, resin particles may be dispersed in the resin particle dispersion using, for example, a phase inversion emulsification method.

Incidentally, the phase inversion emulsification method is a method of dissolving a resin to be dispersed in a hydrophobic organic solvent in which the resin is soluble; conducting neutralization by adding a base to an organic continuous phase (0 phase); and converting the resin (so-called phase inversion) from W/O to O/W by charging an aqueous medium (W phase) to form a discontinuous phase, thereby dispersing the resin as particles in the aqueous medium.

The volume average particle diameter of the resin particles to be dispersed in the resin particle dispersion is, for example, preferably from 0.01 μm to 1 μm, more preferably from 0.08 μm to 0.8 μm, and even more preferably from 0.1 μm to 0.6 μm.

Regarding the volume average particle diameter of the resin particles, a cumulative distribution by volume is drawn from the side of the smallest diameter with respect to divided particle size ranges (channels), using the particle size distribution obtained by the measurement of a laser diffraction-type particle size distribution measuring device (e.g., manufactured by Horiba, Ltd., LA-920), and a particle diameter when the cumulative percentage becomes 50% with respect to the entirety of the particles is measured as a volume average particle diameter D50v. The volume average particle diameter of the particles in other dispersions is also measured in the same manner.

The content of the resin particles contained in the resin particle dispersion is, for example, preferably from 5% by mass to 50% by mass, and more preferably from 20% by mass to 45% by mass.

For example, the colorant particle dispersion and the release agent particle dispersion are also prepared in the same manner as in the case of the resin particle dispersion. That is, the volume average particle diameter, the dispersion medium, the dispersing method, and the content of the particles of the particles in the resin particle dispersion are the same as in the case of the colorant particles dispersed in the colorant particle dispersion and the release agent particles dispersed in the release agent particle dispersion.

—Aggregated Particle Forming Step—

Next, the colorant particle dispersion and the release agent dispersion are mixed together with the resin particle dispersion.

Then, the resin particles, the colorant particles, and the release agent particles are heterogeneously aggregated in the mixed dispersion, thereby forming aggregated particles having a diameter near a target toner particle diameter and containing the resin particles, the colorant particles, and the release agent particles.

Specifically, for example, an aggregating agent is added to the mixed dispersion and a pH of the mixed dispersion is adjusted to acidity (e.g., the pH is from 2 to 5). If necessary, a dispersion stabilizer is added. Then, the mixed dispersion is heated at a temperature of the glass transition temperature of the resin particles (specifically, for example, from a temperature 30° C. lower than the glass transition temperature of the resin particles to a temperature 10° C. lower than the glass transition temperature) to aggregate the particles dispersed in the mixed dispersion, thereby forming the aggregated particles.

In the aggregated particle forming step, for example, the aggregating agent may be added at room temperature (e.g., 25° C.) under stirring of the mixed dispersion using a rotary shearing-type homogenizer, the pH of the mixed dispersion may be adjusted to acidic (e.g., the pH is from 2 to 5), a dispersion stabilizer may be added if necessary, and the heating may then be performed.

Examples of the aggregating agent include a surfactant having an opposite polarity to the polarity of the surfactant used as the dispersing agent to be added to the mixed dispersion, such as inorganic metal salts and di- or higher-valent metal complexes. Particularly, when a metal complex is used as the aggregating agent, the amount of the surfactant used is reduced and charging characteristics are improved.

If necessary, there may be used an additive that forms a complex or a similar bond with the metal ions of the aggregating agent. A chelating agent is preferably used as the additive.

Examples of the inorganic metal salts include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added is, for example, preferably from 0.01 part by mass to 5.0 parts by mass, and more preferably from 0.1 part by mass to less than 3.0 parts by mass with respect to 100 parts by mass of the resin particles.

—Fusion/Coalescence Step—

Next, the aggregated particle dispersion in which the aggregated particles are dispersed is heated at, for example, a temperature that is equal to or higher than the glass transition temperature of the resin particles (e.g., a temperature that is higher than the glass transition temperature of the resin particles by 10° C. to 30° C.) to fuse/coalesce the aggregated particles and form toner particles.

Toner particles are obtained through the foregoing steps.

After the aggregated particle dispersion in which the aggregated particles are dispersed is obtained, toner particles may be produced through a step of further mixing the resin particle dispersion in which the resin particles are dispersed with the aggregated particle dispersion to conduct aggregation so that the resin particles further attach to the surfaces of the aggregated particles, thereby forming second aggregated particles; and a step of fusing/coalescing the second aggregated particles by heating the second aggregated particle dispersion in which the second aggregated particles are dispersed, thereby forming toner particles having a core/shell structure.

After the fusion/coalescence step is finished, the toner particles formed in the solution are subjected to a washing step, a solid-liquid separation step, and a drying step, that are well known, and thus dry toner particles are obtained.

In the washing step, preferably, displacement washing using ion exchange water is sufficiently performed from the viewpoint of charging properties. In addition, the solid-liquid separation step is not particularly limited, but suction filtration, pressure filtration, or the like is preferably performed from the viewpoint of productivity. The method for the drying step is also not particularly limited, but freeze drying, flash jet drying, fluidized drying, vibration-type fluidized drying, or the like is preferably performed from the viewpoint of productivity.

The toner according to this exemplary embodiment is produced by, for example, adding the external additive to dry toner particles that have been obtained, followed by mixing. The mixing is preferably performed with, for example, a V-blender, a Henschel mixer, a Lodige mixer, or the like. Furthermore, if necessary, coarse toner particles may be removed using a vibration sieving machine, a wind-power sieving machine, or the like.

<Electrostatic Charge Image Developing Toner According to the Preferable Aspect of the Invention>

The electrostatic charge image developing toner according to the preferable aspect of the invention (hereinafter referred to as "toner") is a toner containing toner particles and an external additive.

The external additive contains inorganic oxide particles having a volume resistivity of from $1.0 \times 10^8$ Ωcm to $1.0 \times 10^{15}$ Ωcm (medium-resistance particles) and silica particles having an average equivalent circle diameter larger than that of the inorganic oxide particles and having a compaction aggregation degree of from 60% to 95% and a particle compaction ratio of from 0.20 to 0.40 (hereinafter also referred to as "specified silica particles").

Here, hitherto, there is known a toner in which medium-resistance particles (inorganic oxide particles having a volume resistivity in the above range) represented by titanium oxide particles or the like and silica particles are externally added to toner particles. The reason is that high charging under low humidity can be suppressed by using the inorganic oxide particles that has medium resistance while charge-imparting ability under high humidity is held. Even under the same high temperature and high humidity environment, when images having a low image density are repeatedly formed, relative humidity in the developing device decreases and new toner supply also decreases, so that high charging of the toner becomes remarkable and thus a decrease in density is caused in the case where high-resistance particles are used. On the other hand, in the electrostatic charge image development containing a toner and a carrier (hereinafter also referred to as "two-component developer"), when the medium-resistance particles are released from the toner particles and transferred (attached) to the surface of a carrier, charging ability of the carrier may be lowered. This is because the part becomes a charge leaking site especially under high temperature/high humidity.

When the charging amount of the toner is lowered by the decrease in the charging ability of the carrier, fogging (a phenomenon of attachment of a toner to a non-image area) may occur.

On the other hand, as a technology for suppressing the release of the medium-resistance particles from the toner particles, which may cause a decrease in the charging ability of a carrier, there is a method of externally adding large-diameter silica particles that are larger in size than the medium-resistance particles. When the large-diameter silica particles are externally added, the large-diameter silica particles exhibit a cushioning function (spacer function) and a mechanical load is less prone to be applied to the medium-resistance particles. Moreover, since it becomes difficult for the carrier to come into contact with the medium-resistance particles, the release of the medium-resistance particles from the toner particles is easily suppressed.

However, the large-diameter silica particles generally have a high fluidity and are migrated on the toner particles to localize or released from the toner particles and thus the external addition structure of the large-diameter silica particles is prone to change, so that it becomes difficult to exhibit the cushioning function (spacer function) of the large-diameter silica particles. On the other hand, in the case where large-diameter silica particles treated with a silicone oil are externally added, the large-diameter silica particles treated with a silicone oil are prone to attach to the toner particles in an non-homogeneous state or in an aggregated state owing to low fluidity and high aggregation properties, so that it is difficult to realize an aimed external addition structure (external addition structure in which the large-diameter silica particles are attached in the periphery of the portions to which the medium-resistance particles are attached) and also it becomes difficult to exhibit the cushioning function (spacer function) of the large-diameter silica particles.

When it becomes difficult to exhibit the cushioning function (spacer function) of the large-diameter silica particles, a mechanical load is applied to the medium-resistance particles and the carrier is prone to come into contact with the medium-resistance particles, so that there increases a tendency of releasing the medium-resistance particles from the toner particles.

Particularly, when images having a high image density (e.g., an image density of 80% or more) are repeatedly formed under a high-temperature and high humidity environment (e.g., under an environment of a temperature of 30° C. and a humidity of 90% RH), the toner density in the development unit increases, a mechanical load to the medium-resistance particles and a chance for the carrier to come into contact with the medium-resistance particles are enhanced, the amount of the medium-resistance particles released from the toner particles increases, and accordingly, the transferring amount (attaching amount) of the medium-resistance particles to the carrier also increases. As a result, together with a decrease in the charging ability of the carrier, a decrease in the charging amount of the toner occurs and fogging is easily generated.

Accordingly, in the toner according to the preferable aspect of the invention, the specified silica particles are externally added to the toner particles as large-diameter silica particles having a larger average equivalent circle diameter than that of the medium-resistance particles together with the medium-resistance particles and thereby the generation of fogging that occurs at the time when images having a high image density (e.g., an image density of 80% or more) are repeatedly formed under a high-temperature and high humidity environment (e.g., under an environment of a temperature of 30° C. and a humidity of 90% RH, is supressed). The reason is presumed as follows.

First, the specified silica particles having compression aggregation degree and particle compression ratio satisfying the above ranges are silica particles having properties of high fluidity and dispersibility to the toner particles and also high aggregating properties and attaching properties to the toner particles.

Here, silica particles generally have good fluidity but low attaching properties owing to low bulk density and have a property that they are hard to aggregate.

On the other hand, for the purpose of enhancing dispersibility to the toner particle surface together with the fluidity of the silica particles, there is known a technology of surface-treating the surface of the silica particles using a hydrophobilizing agent. According to the technology, the fluidity of the silica particles and dispersibility on the toner particle surface are improved but the aggregating properties are still low.

Moreover, there is also known a technology of surface-treating the surface of silica particles using a hydrophobic treating agent and a silicone oil in combination. According to the technology, the attaching properties to the toner particles are improved and also the aggregating properties are improved. However, contrarily, the fluidity and the dispersibility to the toner particles are prone to decrease.

That is, in the silica particles, it is said that the fluidity and the dispersibility to the toner particles contradict with the aggregating properties and the attaching properties to the toner particles.

On the other hand, as described above, in the specified silica particles, by controlling the compression aggregation degree and the particle compression ratio to the above ranges, four characteristics of the fluidity, the dispersibility to the toner particles, the aggregating properties, and the attaching properties to the toner particles become satisfactory.

In the preferable aspect of the invention, the significance of controlling the compression aggregation degree and the particle compression ratio to the above ranges is as described above.

<Electrostatic Charge Image Developer>

An electrostatic charge image developer according to this exemplary embodiment includes at least the toner according to this exemplary embodiment.

The electrostatic charge image developer according to this exemplary embodiment may be a single-component developer containing only the toner according to this exemplary embodiment, or a two-component developer obtained by mixing the toner with a carrier.

The carrier is not particularly limited, and known carriers are exemplified. Examples of the carrier include a coated carrier in which surfaces of cores formed of a magnetic powder are coated with a coating resin; a magnetic powder dispersion-type carrier in which a magnetic powder is dispersed and blended in a matrix resin; and a resin impregnation-type carrier in which a porous magnetic powder is impregnated with a resin.

The magnetic powder dispersion-type carrier and the resin impregnation-type carrier may be carriers in which constituent particles of the carrier are cores and coated with a coating resin.

Examples of the magnetic powder include magnetic metals such as iron, nickel, and cobalt, and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid copolymer, a straight silicone resin configured to include an organosiloxane bond or a modified product thereof, a fluororesin, polyester, polycarbonate, a phenol resin, and an epoxy resin.

The coating resin and the matrix resin may contain other additives such as conductive particles.

Examples of the conductive particles include particles of metals such as gold, silver, and copper, carbon black, titanium oxide, zinc oxide, tin oxide, barium sulfate, aluminum borates, and potassium titanate.

Here, a coating method using a coating layer forming solution in which a coating resin, and if necessary, various additives are dissolved in an appropriate solvent is mentioned for coating the surface of a core with the coating resin. The solvent is not particularly limited, and may be selected in consideration of the coating resin to be used, coating suitability, and the like.

Specific examples of the resin coating method include a dipping method of dipping cores in a coating layer forming solution, a spraying method of spraying a coating layer forming solution to surfaces of cores, a fluidized bed method of spraying a coating layer forming solution in a state in which cores are allowed to float by flowing air, and a kneader-coater method in which cores of a carrier and a coating layer forming solution are mixed with each other in a kneader-coater and the solvent is removed.

The mixing ratio (mass ratio) of the toner to the carrier in the two-component developer is preferably from 1:100 to 30:100, and more preferably from 3:100 to 20:100 (toner: carrier).

<Image Forming Apparatus/Image Forming Method>

An image forming apparatus and an image forming method according to this exemplary embodiment will be described.

The image forming apparatus according to the exemplary embodiment is provided with an image holding member, a charging unit that charges a surface of the image holding member, an electrostatic charge image forming unit that forms an electrostatic charge image on a charged surface of the image holding member, a developing unit that contains an electrostatic charge image developer and develops the electrostatic charge image formed on the surface of the image holding member with the electrostatic charge image developer as a toner image, a transfer unit that transfers the toner image formed on the surface of the image holding member onto a surface of a recording medium, a cleaning unit that has a cleaning blade for cleaning the surface of the image holding member, and a fixing unit that fixes the toner image transferred onto the surface of the recording medium. As the electrostatic charge image developer, the electrostatic charge image developer according to the exemplary embodiment is applied.

In the image forming apparatus according to this exemplary embodiment, there is performed an image forming method (image forming method according to the exemplary embodiment) including a charging step of charging a surface of an image holding member, an electrostatic charge image forming step of forming an electrostatic charge image on the charged surface of the image holding member, a developing step of developing the electrostatic charge image formed on the surface of the image holding member with the electrostatic charge image developer according to the exemplary embodiment as a toner image, a transfer step of transferring the toner image formed on the surface of the image holding member onto a surface of a recording medium, a cleaning step of cleaning the surface of the image holding member with a cleaning blade, and a fixing step of fixing the toner image transferred onto the surface of the recording medium.

As the image forming apparatus according to this exemplary embodiment, there may be provided an apparatus, such as a direct transfer-type apparatus that directly transfers a toner image formed on a surface of an image holding member onto a recording medium; an intermediate transfer-type apparatus that primarily transfers a toner image formed on a surface of an image holding member onto a surface of an intermediate transfer member, and secondarily transfers the toner image transferred onto the surface of the intermediate transfer member onto a surface of a recording medium; an apparatus or an apparatus that is provided with an erasing unit that irradiates, after transfer of a toner image and before charging, a surface of an image holding member with erasing light for erasing.

In the case of an intermediate transfer-type apparatus, as a transfer unit, there is applied a configuration having, for example, an intermediate transfer member having a surface onto which a toner image is to be transferred, a primary transfer unit that primarily transfers a toner image formed on a surface of an image holding member onto the surface of the intermediate transfer member, and a secondary transfer unit that secondarily transfers the toner image transferred onto the surface of the intermediate transfer member onto a surface of a recording medium.

Incidentally, in the image forming apparatus according to this exemplary embodiment, for example, a part including the developing unit may have a cartridge structure (process cartridge) that is detachable from the image forming apparatus. As the process cartridge, for example, a process cartridge that accommodates the electrostatic charge image developer according to this exemplary embodiment and is provided with a developing unit is preferably used.

Hereinafter, an example of the image forming apparatus according to this exemplary embodiment will be shown. However, this image forming apparatus is not limited thereto. Major parts shown in the drawing will be described, but descriptions of other parts will be omitted.

FIG. 1 is a schematic diagram showing a configuration of the image forming apparatus according to this exemplary embodiment.

The image forming apparatus shown in FIG. 1 is provided with first to fourth electrophotographic image forming units 10Y, 10M, 10C, and 10K (image forming units) that output yellow (Y), magenta (M), cyan (C), and black (K) images based on color-separated image data, respectively. These image forming units (hereinafter, may be simply referred to as "units") 10Y, 10M, 10C, and 10K are arranged side by side at predetermined intervals in a horizontal direction. These units 10Y, 10M, 10C, and 10K may be process cartridges that are detachable from the image forming apparatus or may have a structure additionally having unit(s) capable of outputting color(s) other than the above four colors.

An intermediate transfer belt 20 as an intermediate transfer member is installed above the units 10Y, 10M, 10C, and 10K in the drawing to extend through the units. The intermediate transfer belt 20 is wound on a driving roll 22 and a support roll 24 contacting the inner surface of the intermediate transfer belt 20, which are disposed to be separated from each other on the left and right sides in the drawing, and travels in a direction toward the fourth unit 10K from the first unit 10Y. The support roll 24 is pressed in a direction in which it departs from the driving roll 22 by a spring or the like (not shown), and a tension is given to the intermediate transfer belt 20 wound on both of the rolls. In addition, an intermediate transfer member cleaning device 30 opposed to the driving roll 22 is provided on a surface of the intermediate transfer belt 20 on the image holding member side.

Developing devices (developing units) 4Y, 4M, 4C, and 4K of the units 10Y, 10M, 10C, and 10K are supplied with toner including four color toner, that is, a yellow toner, a magenta toner, a cyan toner, and a black toner accommodated in toner cartridges 8Y, 8M, 8C, and 8K, respectively.

The first to fourth units 10Y, 10M, 10C, and 10K have the same configuration, and accordingly, only the first unit 10Y that is disposed on the upstream side in a traveling direction of the intermediate transfer belt to form a yellow image will be representatively described herein. The same parts as in the first unit 10Y will be denoted by the reference numerals with magenta (M), cyan (C), and black (K) added instead of yellow (Y), and descriptions of the second to fourth units 10M, 10C, and 10K will be omitted.

The first unit 10Y has a photoreceptor 1Y acting as an image holding member. Around the photoreceptor 1Y, a charging roll (an example of the charging unit) 2Y that charges a surface of the photoreceptor 1Y to a predetermined potential, an exposure device (an example of the electrostatic charge image forming unit) 3 that exposes the charged surface with laser beams 3Y based on a color-separated image signal to form an electrostatic charge image, a developing device (an example of the developing unit) 4Y that supplies a charged toner to the electrostatic charge image to develop the electrostatic charge image, a primary transfer roll (an example of the primary transfer unit) 5Y that transfers the developed toner image onto the intermediate transfer belt 20, and a photoreceptor cleaning device 6Y having a cleaning blade 6Y-1 that removes the toner remaining on the surface of the photoreceptor 1Y after primary transfer, are arranged in sequence.

The primary transfer roll 5Y is disposed inside the intermediate transfer belt 20 to be provided at a position opposed to the photoreceptor 1Y. Furthermore, bias supplies (not shown) that apply a primary transfer bias are connected to the primary transfer rolls 5Y, 5M, 5C, and 5K, respectively. Each bias supply changes a transfer bias that is applied to each primary transfer roll under the control of a controller that is not shown.

Hereinafter, an operation of forming a yellow image in the first unit 10Y will be described.

First, before the operation, the surface of the photoreceptor 1Y is charged to a potential of −600 V to −800 V by the charging roll 2Y.

The photoreceptor 1Y is formed by laminating a photosensitive layer on a conductive substrate (e.g., volume resistivity at 20° C.: $1 \times 10^{-6}$ Ωcm or less). The photosensitive layer typically has high resistance (that is about the same as the resistance of a general resin), but has properties in which when laser beams 3Y are applied, the specific resistance of a part irradiated with the laser beams changes. Accordingly, the laser beams 3Y are output to the charged surface of the photoreceptor 1Y via the exposure device 3 in accordance with image data for yellow sent from the controller that is not shown. The laser beams 3Y are applied to the photosensitive layer on the surface of the photoreceptor 1Y, whereby an electrostatic charge image of a yellow image pattern is formed on the surface of the photoreceptor 1Y.

The electrostatic charge image is an image that is formed on the surface of the photoreceptor 1Y by charging, and is a so-called negative latent image, that is formed by applying laser beams 3Y to the photosensitive layer so that the specific resistance of the irradiated part is lowered to cause charges to flow on the surface of the photoreceptor 1Y, while charges stay on a part to which the laser beams 3Y are not applied.

The electrostatic charge image formed on the photoreceptor 1Y is rotated up to a predetermined developing position with the traveling of the photoreceptor 1Y. The electrostatic charge image on the photoreceptor 1Y is visualized (developed) as a toner image at the developing position by the developing device 4Y.

The developing device 4Y accommodates, for example, an electrostatic charge image developer containing at least a yellow toner and a carrier. The yellow toner is frictionally charged by being stirred in the developing device 4Y to have a charge with the same polarity (negative polarity) as the charge that is on the photoreceptor 1Y, and is thus held on the developer roll (an example of the developer holding member). By allowing the surface of the photoreceptor 1Y to pass through the developing device 4Y, the yellow toner electrostatically attaches to the latent image part having been erased on the surface of the photoreceptor 1Y, whereby the latent image is developed with the yellow toner. The photoreceptor 1Y having the yellow toner image formed thereon continuously travels at a predetermined rate and the toner image developed on the photoreceptor 1Y is transported to a predetermined primary transfer position.

When the yellow toner image on the photoreceptor 1Y is transported to the primary transfer position, a primary transfer bias is applied to the primary transfer roll 5Y and an electrostatic force toward the primary transfer roll 5Y from the photoreceptor 1Y acts on the toner image, whereby the toner image on the photoreceptor 1Y is transferred onto the intermediate transfer belt 20. The transfer bias applied at this time has the opposite polarity (+) to the toner polarity (−), and, for example, is controlled to +10 μA in the first unit 10Y by the controller (not shown).

On the other hand, the toner remaining on the photoreceptor 1Y is dammed by an elastic blade (6Y-1) abutting to the photoreceptor at an appropriate angle and is removed and collected by the cleaning device 6Y.

The primary transfer biases that are applied to the primary transfer rolls 5M, 5C, and 5K of the second unit 10M and the subsequent units are also controlled in the same manner as in the case of the first unit.

In this manner, the intermediate transfer belt 20 onto which the yellow toner image is transferred in the first unit 10Y is sequentially transported through the second to fourth units 10M, 10C, and 10K, and the toner images of respective colors are multiply-transferred in a superimposed manner.

The intermediate transfer belt 20 onto which the four color toner images have been multiply-transferred through the first to fourth units reaches a secondary transfer part that is composed of the intermediate transfer belt 20, the support roll 24 contacting the inner surface of the intermediate transfer belt, and a secondary transfer roll (an example of the secondary transfer unit) 26 disposed on the image holding surface side of the intermediate transfer belt 20. Meanwhile, a recording sheet (an example of the recording medium) P is supplied to a gap between the secondary transfer roll 26 and the intermediate transfer belt 20, that are brought into contact with each other, via a supply mechanism at a predetermined timing, and a secondary transfer bias is applied to the support roll 24. The transfer bias applied at this time has the same polarity (−) as the toner polarity (−), and an electrostatic force toward the recording sheet P from the intermediate transfer belt 20 acts on the toner image, whereby the toner image on the intermediate transfer belt 20 is transferred onto the recording sheet P. In this case, the secondary transfer bias is determined depending on the resistance detected by a resistance detecting unit (not shown) that detects the resistance of the secondary transfer part, and is voltage-controlled.

Thereafter, the recording sheet P is sent to a pressure-contacting part (nip part) between a pair of fixing rolls in a fixing device (an example of the fixing unit) 28 and the toner image is fixed to the recording sheet P, whereby a fixed image is formed.

Examples of the recording sheet P onto which a toner image is transferred include plain paper that is used in electrophotographic copiers, printers, and the like. As a recording medium, an OHP sheet is also exemplified other than the recording sheet P.

The surface of the recording sheet P is also preferably smooth in order to further improve smoothness of the image surface after fixing. For example, coating paper obtained by coating a surface of plain paper with a resin or the like, art paper for printing, and the like are preferably used.

The recording sheet P on which the fixing of the color image is completed is transported toward a discharge part, and a series of the color image forming operations end.

<Process Cartridge/Toner Cartridge>

A process cartridge according to this exemplary embodiment will be described.

The process cartridge according to this exemplary embodiment is provided with a developing unit that accommodates the electrostatic charge image developer according to this exemplary embodiment and develops an electrostatic charge image formed on a surface of an image holding member with the electrostatic charge image developer as a toner image, and is detachable from an image forming apparatus.

The process cartridge according to this exemplary embodiment is not limited to the above-described configuration, and may be configured to include a developing device, and if necessary, at least one selected from other units such as an image holding member, a charging unit, an electrostatic charge image forming unit, and a transfer unit.

Hereinafter, an example of the process cartridge according to this exemplary embodiment will be shown. However, this process cartridge is not limited thereto. Major parts shown in the drawing will be described, but descriptions of other parts will be omitted.

Figure 2:
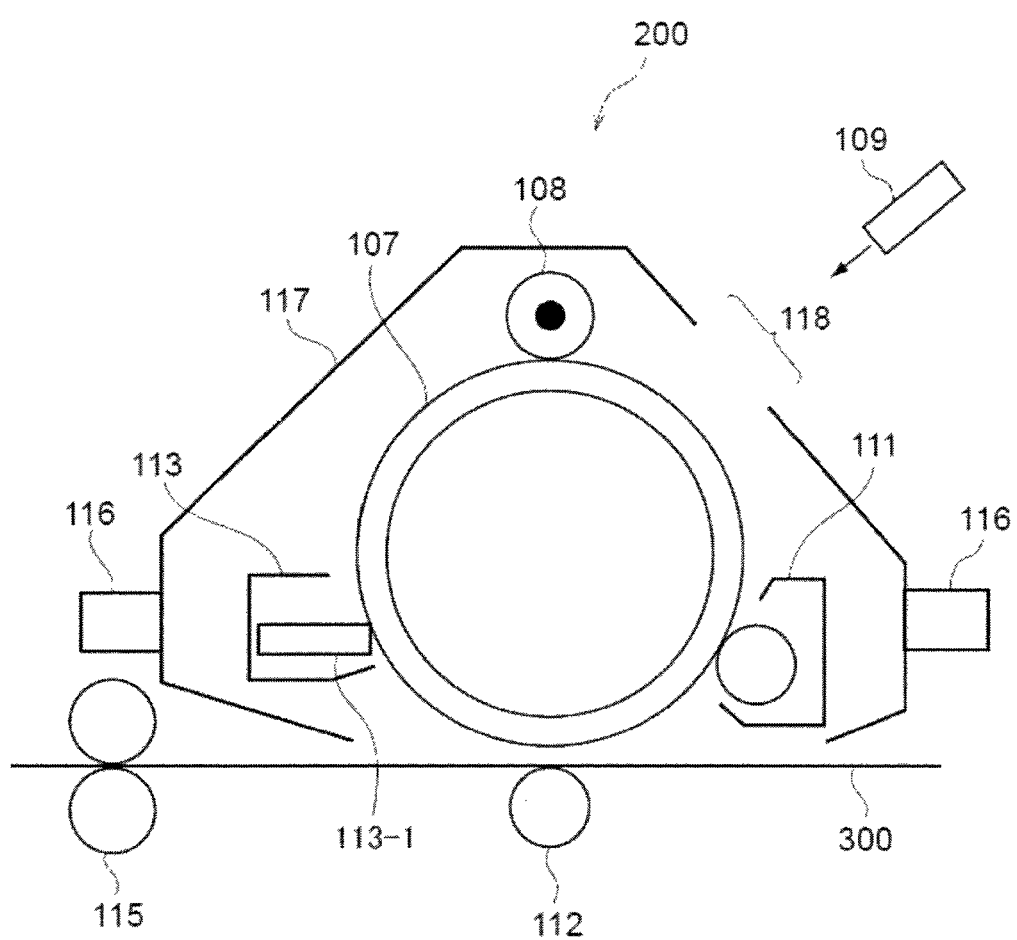
FIG. 2 is a schematic configuration diagram showing an example of a process cartridge according to the exemplary embodiment.

FIG. 2 is a schematic diagram showing a configuration of the process cartridge according to this exemplary embodiment.

A process cartridge 200 shown in FIG. 2 is formed as a cartridge having a configuration in which a photoreceptor 107 (an example of the image holding member) and a charging roll 108 (an example of the charging unit), a developing device 111 (an example of the developing unit), and a photoreceptor cleaning device 113 having a cleaning blade 113-1, which are provided around the photoreceptor 107, are integrally combined and held by the use of, for example, a housing 117 provided with a mounting rail 116 and an opening 118 for exposure.

In FIG. 2, the reference numeral 109 represents an exposure device (an example of the electrostatic charge image forming unit), the reference numeral 112 represents a transfer device (an example of the transfer unit), the reference numeral 115 represents a fixing device (an example of the fixing unit), and the reference numeral 300 represents a recording sheet (an example of the recording medium).

Next, a toner cartridge according to this exemplary embodiment will be described.

The toner cartridge according to this exemplary embodiment accommodates the toner according to this exemplary embodiment and is detachable from an image forming apparatus. The toner cartridge accommodates a toner for replenishment for being supplied to the developing unit provided in the image forming apparatus.

The image forming apparatus shown in FIG. 1 has such a configuration that the toner cartridges 8Y, 8M, 8C, and 8K are detachable therefrom, and the developing devices 4Y, 4M, 4C, and 4K are connected to the toner cartridges corresponding to the respective developing devices (colors) via toner supply tubes that are not shown, respectively. In addition, when the toner accommodated in the toner cartridge runs low, the toner cartridge is replaced.

EXAMPLES

Hereinafter, the exemplary embodiment will be described in detail using Examples, but is not limited to these examples. Unless specifically noted, "parts" and "%" means "parts by mass" and "% by mass" in the following description.

[Synthesis of Polyester Resin (1)]

The following monomers are charged into a well-dried and $N_2$-substituted three-necked flask and the whole is heated to 200° C. while sending $N_2$.

Bisphenol A-ethylene oxide adduct (BPA-EO): 31 parts by mol
Ethylene glycol (EG): 19 parts by mol
Terephthalic acid: 34 parts by mol
Succinic acid: 16 parts by mol When the monomers are dissolved, stirring is started and, after 0.04 part of tetrabutoxy titanate is added, a reaction is allowed to proceed while maintaining the temperature in the system at 200° C. While a minute amount of a sample is collected on the way and molecular weight is measured, the proceeding of the reaction is controlled by temperature control and water collection under a reduced-pressure atmosphere to obtain a desired polyester resin (1).

[Synthesis of Polyester Resin (2)]

The following monomers are charged into a well-dried and $N_2$-substituted three-necked flask and the whole is heated to 200° C. while sending $N_2$.

Bisphenol A-ethylene oxide adduct (BPA-EO): 34 parts by mol
Bisphenol A-propylene oxide adduct (BPA-PO): 15 parts by mol
Ethylene glycol (EG): 1 part by mol
Terephthalic acid: 16 parts by mol
Succinic acid: 20 parts by mol When the monomers are dissolved, stirring is started and, after 0.04 part of tetrabutoxy titanate is added, a reaction is allowed to proceed while maintaining the temperature in the system at 200° C. While a minute amount of a sample is collected on the way and molecular weight is measured, the proceeding of the reaction is controlled by temperature control and water collection under a reduced-pressure atmosphere. At the time point when the weight average molecular weight becomes around 20,000, 14 parts by mol of powdery anhydrous trimeritic acid is charged to allow a crosslinking reaction to proceed, thereby obtaining a desired polyester resin (2).

[Synthesis of Polyester Resin (3)]

A desired polyester resin (3) is obtained by the same operations as in the case of the polyester resin (1) except that the monomers are changed to the following: 1,9-nonanediol: 49 parts and 1,10-dodecanedioic acid: 51 parts.

—Preparation of Resin Particle Dispersion—

[Preparation of Polyester Resin Particle Dispersion (1)]

The polyester resin (1) obtained by the above synthetic operations are roughly crushed with a hammer mill and, using the crushed one, a resin particle dispersion is prepared as follows.

First, a solvent for dissolving the resin is charged in the following ratio to a 2 L reaction flask fitted with a blade capable of stirring and mixing, a reflux mechanism, and a pressure-reducing mechanism with a vacuum pump.

Ethyl acetate (a reagent manufactured by Wako Pure Chemical Industries, Ltd.): 50 parts Isopropyl alcohol (IPA: a reagent manufactured by Wako Pure Chemical Industries, Ltd.): 15 parts Then, while $N_2$ is sent at a rate of 0.2 L/m to substitute the air in the system with $N_2$, the polyester resin (1): 100 parts is gradually charged and dissolved under stirring. The reaction flask is maintained at 45° C. by heating and stirring is performed for about 1 hour until the polyester resin (1) is dissolved in the solvent.

A 10% ammonia water (a reagent manufactured by Wako Pure Chemical Industries, Ltd.): 10 parts is added dropwise thereto and, after it is confirmed that the ammonia water is well-mixed in the resin solution, ion exchange water: 250 parts is charged using a metering pump. The dropwise addition rate of the ion exchange water is appropriately controlled so that no added water remained on the surface of the resin solution.

After the dropwise addition of the ion exchange water, the inside of the system is rendered under a reduced pressure atmosphere and the solvent is distilled away while stirring is continued. At the time point when the amount of the mixed solvent collected by distillation corresponds to 55 parts, ion exchange water: 80 parts at 40° C. is further added into the system and the solvent is further distilled away under a reduced pressure atmosphere. The time point when the amount of the collected mixed solvent reaches 180 parts is determined as a final point, temperature control is stopped, and the whole is cooled to normal temperature under stirring. The particle diameter of the resulting resin particles is measured using a laser diffraction/scattering particle size distribution measuring device (manufactured by Horiba, Ltd., LA-920) and a polyester resin particle dispersion (1) having an average particle diameter of 190 nm is obtained.

The polyester resin (2) is also converted into a polyester resin particle dispersion (2) having an average particle diameter of 195 nm by the same operations as in the case of the polyester resin (1).

[Preparation of Polyester Resin Particle Dispersion (3)]

The polyester resin (3) obtained by the above synthetic operations are roughly crushed with a hammer and used.

First, a solvent for dissolving the resin is charged in the following ratio to a 2 L reaction flask fitted with a blade capable of stirring and mixing, a reflux mechanism, and a pressure-reducing mechanism with a vacuum pump.

Ethyl acetate (a reagent manufactured by Wako Pure Chemical Industries, Ltd.): 60 parts Isopropyl alcohol (IPA: a reagent manufactured by Wako Pure Chemical Industries, Ltd.): 20 parts Then, while $N_2$ is sent at a rate of 0.2 L/m to substitute the air in the system with $N_2$, the polyester resin (3): 100 parts is charged, the reaction flask is maintained at 60° C. by heating, and stirring is performed for about 1 hour until the polyester resin (3) is dissolved.

A 10% ammonia water (a reagent manufactured by Wako Pure Chemical Industries, Ltd.): 15 parts is added dropwise thereto and subsequently, ion exchange water: 250 parts heated to 60° C. is charged using a metering pump. The dropwise addition rate of the ion exchange water is appropriately controlled so that no added water remained on the surface of the resin solution.

After the dropwise addition of the ion exchange water, the inside of the system is rendered under a reduced pressure atmosphere and the solvent is distilled away while stirring is continued. At the time point when the amount of the mixed solvent collected by distillation corresponds to 55 parts, ion exchange water: 50 parts at 60° C. is further added into the system and the solvent is further distilled away under a reduced pressure atmosphere. The time point when the amount of the collected mixed solvent reaches 150 parts is determined as a final point, temperature control is stopped, and the whole is cooled to normal temperature under stirring. The particle diameter of the resulting resin particles is measured using a laser diffraction/scattering particle size distribution measuring device (manufactured by Horiba, Ltd., LA-920) and a polyester resin particle dispersion (3) having an average particle diameter of 220 nm is obtained.

[Preparation of Styrene Acrylic Resin particle Dispersion]

The following oil layer components and aqueous layer 1 components are placed in a flask (vessel 1) and stirred and mixed to form an emulsion solution. Moreover, the aqueous layer 2 components are charged into another flask (vessel 2), the inside of the vessel 2 is thoroughly substituted with nitrogen, and the inside of the vessel 2 is heated until 75° C. on a hot water bath while stirring.

Oil Layer:

Styrene (manufactured by Wako Pure Chemical Industries. Ltd.): 31 parts n-Butyl acrylate (manufactured by Wako Pure Chemical Industries, Ltd.): 9.5 parts β-Carboxyethyl acrylate (manufactured by Rhodia Nicca. Ltd.): 1,4 parts Dodecanethiol (manufactured by Wako Pure Chemical Industries. Ltd.): 0.4 part Aqueous layer 1:

Ion exchange water: 17.6 parts

Anionic surfactant (Dowfax 2AI, manufactured by Dow): 0.4 part Aqueous layer 2:

Ion exchange water: 49 parts

Anionic surfactant (Dowfax 2AI, manufactured by Dow): 0.1 part

Next, after 0.4 part of the emulsion solution in the vessel 1 is charged, 0.5 parts of a 10% aqueous solution of ammonium persulfate (manufactured by Wako Pure Chemical Industries, Ltd.) is gradually added dropwise to initiate polymerization. Furthermore, remaining emulsion solution in the vessel 1 is gradually added dropwise to the vessel 2 under a nitrogen stream over a period of 3 hours to allow emulsion polymerization to proceed. After completion of the dropwise addition, the reaction is allowed to proceed at 75° C. for another 3 hours in the vessel 2 to form a styrene-acrylic resin particle dispersion.

The particle diameter of the resulting resin particles is measured using a laser diffraction/scattering particle size distribution measuring device (manufactured by Horiba, Ltd., LA-920) and a styrene-acrylic resin particle dispersion (1) having an average particle diameter of 315 nm is obtained.

—Preparation of Colorant Particle Dispersion—

Cyan pigment [Pigment Blue 15:3, manufactured by Dainichiseika Color & Chemicals Mfg. Co., Ltd.]: 10 parts Anionic surfactant [Neogen SC, manufactured by DKS Co., Ltd.]: 2 parts Ion exchange water: 80 parts The above components are mixed and then circulated and dispersed for 1 hour using a high-pressure impact type dispersing machine Ultimizer [HJP 30006, SUGINO MASHINE LIMITED] to obtain a colorant particle dispersion having a volume average particle diameter of 180 nm and a solid content of 20%.

—Preparation of Release Agent Dispersion—

Fischer Tropscb Wax [FNP-0090, melting temperature: 90° C., manufactured by Nippon Seiro Co., Ltd.]: 50 parts Anionic surfactant [Neogen SC, manufactured by DKS Co., Ltd.]: 2 parts Ion exchange water: 200 parts The above components are heated to 120° C. and are mixed/dispersed in Ultra Turrax T50 manufactured by IKA, and subsequently the resulting one is subjected to a dispersion treatment in a pressure-injection type homogenizer to obtain a release agent particle dispersion having a volume average particle diameter of 200 nm and a solid content of 20%.

—Manufacture of Toner Particles (1)—

Polyester resin particle dispersion (1): 150 parts
Polyester resin particle dispersion (2): 150 parts
Polyester resin particle dispersion (3): 50 parts
Colorant particle dispersion: 40 parts
Release agent particle dispersion: 50 parts
Ion exchange water: 500 parts The above components are charged into a stainless steel-made flask and are stirred and mixed at normal temperature. Then, after pH in the system is adjusted to 5.0 or lower with a 0.5N aqueous nitric acid solution, the whole is thoroughly mixed using a homogenizer (manufactured by IKA, Ultra Turrax T50). A 1.2% aqueous aluminum sulfate solution: 0.4 part is added dropwise little by little and the whole is thoroughly mixed and dispersed after dropwise addition. After the absence of any coarse powder component is confirmed by particle size measurement, the flask is heated to 48° C. on a heating oil bath with stirring. After it is maintained at 48° C. for 30 minutes, a mixture of the following resin dispersions is slowly added dropwise.

Polyester resin particle dispersion (1): 75 parts
Polyester resin particle dispersion (2): 75 parts Thereafter, after pH in the system is adjusted to 8.0 using an aqueous sodium hydroxide solution having a concentration of 0.5 mol/L, the stainless steel-made flask is tightly sealed and heated to 90° C. while stirring is continued, followed by maintenance for 3 hours. In the way, for control to a desired shape, pH in the system is finely adjusted. After completion of the reaction, the whole is cooled to room temperature at a temperature-dropping rate of 2° C./minute, a suspension is taken out, and, after filtration for removal of a coarse powder and the like and washing with ion exchange water, solid-liquid separation is conducted by Nutsche type suction filtration. This is further re-dispersed using 3 L of ion exchange water at 30° C. and washed by stirring for 15 minutes. This washing operation is repeated and, when pH of the filtrate becomes 7.5 and electric conductivity becomes 6.7 µS/cm, final solid-liquid separation is performed. Then, freeze-drying is performed under vacuum to obtain toner particles (1).

The volume average particle diameter D50v of the toner particles (1) is 5.3 µm and the shape factor is 129.

(Manufacture of Toner Particles (2))

Polyester resin particle dispersion (1): 130 parts
Polyester resin particle dispersion (2): 130 pans
Polyester resin particle dispersion (3): 45 pads
Colorant particle dispersion: 45 parts
Release agent particle dispersion: 20 parts
Ion exchange water: 500 parts The above components are charged into a stainless steel-made flask and are stirred and mixed at normal temperature. Then, after pH in the system is adjusted to 5.0 or lower with a 0.5N aqueous nitric acid solution, the whole is thoroughly mixed using a homogenizer (manufactured by IKA, Ultra Turrax T50). A 1.2% aqueous aluminum sulfate solution: 0.4 part is added dropwise little by little and the whole is thoroughly mixed and dispersed after dropwise addition. After the absence of any coarse powder component is confirmed by particle size measurement, the flask is heated to 40° C. on a heating oil bath with stirring. After it is maintained at 42° C. for 30 minutes, a mixture of the following resin dispersions is slowly added dropwise separately in several times.

Polyester resin particle dispersion (1): 70 parts
Polyester resin particle dispersion (2): 70 parts
Release agent particle dispersion: 10 parts Thereafter, after pH in the system is adjusted to 8.0 using an aqueous sodium hydroxide solution having a concentration of 0.5 mol/L, the stainless steel-made flask is tightly sealed and heated to 85° C. while stirring is continued, followed by maintenance for 2 hours. In the way, for control to a desired shape, pH in the system is finely adjusted. After completion of the reaction, the whole is cooled to room temperature at a temperature-dropping rate of 2° C./minute, a suspension is taken out, and, after filtration for removal of a coarse powder and the like and washing with ion exchange water, solid-liquid separation is conducted by Nutsche type suction filtration. This is further re-dispersed using 3 L of ion exchange water at 30° C. and washed by stirring for 15 minutes. This washing operation is repeated and, when pH of the filtrate becomes 7.5 and electric conductivity becomes 6.7 µS/cm, final solid-liquid separation is performed. Then, freeze-drying is performed under vacuum to obtain toner particles (2).

The volume average particle diameter D50v of the toner particles (2) is 3.6 µm and the shape factor is 127.

(Manufacture of Toner Particles (3))

Syrene-acrylic resin particle dispersion: 35 parts
Colorant particle dispersion: 8 parts
Release agent particle dispersion: 12 parts
Ion exchange water: 100 parts After the above components are charged into a round stainless steel-made flask and are stirred, pH in the system is adjusted to 4.0 or lower with a 0.5N aqueous nitric acid solution. Then, the whole is thoroughly mixed using a homogenizer (manufactured by IKA, Ultra Turrax T50, polyaluminum chloride (manufactured by Asada Chemical Industry Co., Ltd., PAC 100W): 0.2 part is added dropwise little by little and the whole is further thoroughly dispersed. After the absence of any coarse powder component is confirmed by particle size measurement, the inside of the flask is heated to 48° C. on a heating oil bath with stirring. After it is maintained at that temperature for 30 minutes, the temperature of the heating oil bath is further elevated to 50° C. and the whole is maintained at that temperature for 1 hour, thereby obtaining aggregated particles. Then, styrene-acrylic resin particle dispersion: 15 parts is further added and gentle stirring is performed.

Thereafter, after pH in the system is adjusted to a neutral region using an aqueous sodium hydroxide solution having a concentration of 0.5 mol/L, the whole is heated to 95° C. while stirring is continued and maintained at the temperature for 5 hours to perform fusion under heating. After completion, the flask is cooled, a suspension is taken out and thoroughly washed with ion exchange water, and solid-liquid separation is conducted by Nutsche type suction filtration. Then, the resultant is further re-dispersed in 3 L of ion exchange water at 40° C. and washed with stirring for 15 minutes. After this washing operation is repeated several times, solid-liquid separation is performed by Nutsche type suction filtration and freeze-drying is performed under vacuum to obtain toner particles (3).

The volume average particle diameter D50v of the toner particles (3) is 5.7 µM and the shape factor is 131.

(Manufacture of Toner Particles (4))
   Styrene-acrylic resin particle dispersion: 33 parts
   Colorant particle dispersion: 10 parts
   Release agent particle dispersion: 13 parts
   Ion exchange water: 101 parts After the above components are charged into a round stainless steel-made flask and are stirred, pH in the system is adjusted to 4.0 or lower with a 0.5N aqueous nitric acid solution. Then, while the whole is thoroughly mixed in a homogenizer (manufactured by IKA, Ultra Turrax T50) with cooling on an ice bath, polyaluminum chloride (manufactured by Asada Chemical Industry Co., Ltd., PAC 100W): 0.25 part is added dropwise little by little and the whole is further thoroughly dispersed. After the absence of any coarse powder component is confirmed by particle size measurement, the inside of the flask is heated to 35° C. on a heating oil bath with stirring and is maintained at that temperature for 1 hour, thereby obtaining aggregated particles. Then, the styrene-acrylic resin particle dispersion: 17 parts is further added and gentle stirring is performed.

Thereafter, after pH in the system is adjusted to a neutral region using an aqueous sodium hydroxide solution having a concentration of 0.5 mol/L, the whole is heated to 95° C. while stirring is continued and is maintained at the temperature for 5 hours to perform fusion under heating. After completion, the flask is cooled, a suspension is taken out and thoroughly washed with ion exchange water, and solid-liquid separation is conducted by Nutsche type suction filtration. Then, the resultant one is further re-dispersed in 3 L of ion exchange water at 40° C. and washed with stirring for 15 minutes. After this washing operation is repeated several times, solid-liquid separation is performed by Nutsche type suction filtration and freeze-drying is performed under vacuum to obtain toner particles (4).

The volume average particle diameter D50v of the toner particles (4) is 2.8 μm and the shape factor is 109.
(Manufacture of Toner Particles (5))
(Manufacture of Unmodified Polyester Resin)
   Bisphenol A-ethylene oxide adduct (BPA-EO): 180 parts
   Bisphenol A-propylene oxide adduct (BPA-PO): 25 parts
   Terephthalic acid: 210 parts The above monomers are charged into a well-dried and $N_2$-substituted three-necked flask and the whole is heated to 190° C. while sending $N_2$, followed by through mixing. After dibutyltin oxide: 0.1 part is added, the temperature in the system is raised to 220° C. and a reaction is allowed to proceed while maintaining the temperature. While a minute amount of a sample is collected on the way and molecular weight is measured, the proceeding of the reaction is controlled by temperature control and water collection under a reduced-pressure atmosphere, thereby obtaining a desired condensate.
(Manufacture of Polyester Prepolymer)
   Bisphenol A-ethylene oxide adduct (BPA-EO): 183 pans
   Bisphenol A-propylene oxide adduct (BPA-PO): 24 parts
   Terephthalic acid: 8 parts
   Isophthalic acid: 80 parts The above monomers are charged into a well-dried and $N_2$-substituted three-necked flask and the whole is heated to 190° C. while sending $N_2$, followed by through mixing. After dibutyltin oxide: 0.5 part is added, the temperature in the system is raised to 220° C. and a reaction is allowed to proceed while maintaining the temperature. While a minute amount of a sample is collected on the way and molecular weight is measured, the proceeding of the reaction is controlled by temperature control and water collection under a reduced-pressure atmosphere, thereby obtaining a desired condensate. Then, after the temperature is dropped to 180° C., phthalic anhydride: 10 parts is added and reacted with stirring under a reduced pressure atmosphere for 3 hours.

In another well-dried and $N_2$-substituted three-necked flask are placed the condensate obtained above: 350 parts, isophorone diisocyanate: 25 parts, and ethyl acetate: 450 parts, and the mixture is heated at 75° C. for 5 hours while sending $N_2$ to obtain a polyester prepolymer having an isocyanate group (hereinafter referred to as "isocyanate-modified polyester prepolymer").
(Manufacture of Ketimine Compound)
   Methyl Ethyl Ketone: 20 parts
   Isophoronediamine: 15 parts The above materials are placed in a vessel and stirred under heating at 55° C. to obtain a ketimine compound.
(Manufacture of Pigment Dispersion)
   Cyan pigment [Pigment Blue 15:3, manufactured by Dainichiseika Color & Chemicals Mfg. Co., Ltd.]: 20 parts
   Ethyl acetate: 75 parts
   Solsperse 5000 (manufactured by Zeneca): 1 part The above components are mixed and dissolved/dispersed using a sand mill to obtain a pigment dispersion.
(Manufacture of Release Agent Dispersion)
   Paraffin wax (melting temperature; 89° C.): 30 parts
   Ethyl acetate: 270 parts The above components are wet-pulverized in a state that they are cooled at 10° C. in a microbeads type dispersing device (DCP mill) to obtain a release agent dispersion.
(Preparation of Oil-Phase Liquid)
   Pigment dispersion: 40 parts
   Bentonite (manufactured by Wako Pure Chemical Industries, Ltd.): 5 parts
   Ethyl acetate: 55 parts The above components are charged and thoroughly stirred and mixed. To the obtained mixed liquid,
   Unmodified polyester resin: 135 parts
   Release agent dispersion: 75 parts
are added and the whole is thoroughly stirred to prepare an oil-phase liquid.
(Manufacture of Styrene-Acrylic Resin Particle Dispersion (2))
   Styrene: 85 parts
   n-Butyl acrylate: 110 parts
   Methacrylic acid: 85 parts
   Methacrylic acid polyoxyalkylne sulfuric acid ester Na (ELEMINOL RS-30, manufactured by Sanyo Chemical Industries, Ltd.): 10 parts
   Dodecancthiol: 5 parts The above components are charged into a reaction vessel capable of performing refluxing and are thoroughly stirred and mixed. Ion exchange water: 650 parts and ammonium persulfate: 1 part are promptly charged into the above mixture and the whole is dispersed and emulsified in a homogenizer (manufactured by IKA, Ultra Turrax T50) while being maintained at room temperature or lower to form a white emulsion. While sending $N_2$ and stirring, the temperature in the system is raised to 75° C. and emulsion polymerization is continued as it is for 5 hours. Furthermore, after a 1% aqueous ammonium persulfate solution: 20 parts is gradually added dropwise, the whole is maintained at 75° C. for 2 hours to complete the polymerization.
(Preparation of Aqueous Phase Liquid)
Styrene-acrylic resin particle dispersion (2): 60 parts
2% aqueous solution of Serogen BS-H (CMC, DKS Co., Ltd.): 200 parts Anionic surfactant (Dowfax 2A1, manufactured by Dow): 4 parts
Ion exchange water: 200 parts The above components are thoroughly stirred and mixed to prepare an aqueous phase liquid.

Manufacture of Toner Parligles (5)–
Oil-layer liquid: 350 parts
Isocyanate-modified polyester prepolymer: 30 parts
Ketimine compound: 1 part The above components are charged into a round-bottom stainless steel-made flask and, after a mixed oil-layer liquid is prepared by stirring for 2 minutes by a homogenizer (manufactured by IKA, Ultra Turrax T50), the aqueous layer liquid: 900 parts is added to the flask and the whole is promptly emulsified in a forced manner by the homogenizer (8000 rpm) for about 1 minute. Then, the emulsion is stirred at normal temperature or lower under normal pressure (1 atm) for about 15 minutes using a paddle type stirrer and thus particle formation and a urea modification reaction of the polyester resin are allowed to proceed. Thereafter, while the solvent is distilled away under reduced pressure or removed under normal pressure, the whole is stirred at 80° C. for 7 hours to complete the urea modification reaction.

After cooling to normal temperature, a suspension of formed particles is taken out and thoroughly washed with ion exchange water and solid-liquid separation is performed by Nusche type suction filtration. Then, the resultant one is further re-dispersed in ion exchange water at 40° C. and washed with stirring for 15 minutes. After this washing operation is repeated several times, solid-liquid separation is performed by Nutsche type suction filtration and freeze-drying is performed under vacuum to obtain toner particles (5).

The volume average particle diameter D50v of the toner particles (5) is 6.2 μm and the shape factor is 123.

(Manufacture of Toner Particles (6))
Styrene (manufactured by Wako Pure Chemical Industries, Ltd.); 82 parts
n-Butyl acrylate (manufactured by Wako Pure Chemical Industries, Ltd.): 18 parts
Divinylbenzene (manufactured by Wako Pure Chemical Industries, Ltd.): 0.7 part
Dodecanethiol (manufactured by Wako Pure Chemical Industries, Ltd.): 2 parts
Cyan pigment [Pigment Blue 15:3, manufactured by Dainichiseika Color & Chemicals Mfg. Co., Ltd.]: 7 parts After the above materials are placed in a stainless steel vessel and pre-mixed by stirring, the whole is thoroughly dispersed using a media type dispersing device (paint shaker) to form a polymerizable monomer composition. Moreover, the following components are charged into a round-bottom stainless steel-made flask and are heated to 60° C.

Ion exchange water: 70 parts
0.1 mol/L aqueous $Na_3PO_4$ solution: 100 parts
1N aqueous HCl solution: 3 parts Then, the above mixed liquid is dispersed and stirred using a homogenizer (manufactured by M Technique Co., Ltd., Cleamix) under a condition of a rotation number of 13,000 rpm. A 1.0 mol/L aqueous $CaCl_2$ solution: 10 parts is gradually added thereto to prepare an aqueous medium containing $Ca_3(PO_4)_2$. While maintaining 60° C., the dispersed polymerizable monomer composition is charged into the $Ca_3(PO_4)_2$ dispersion and the whole is stirred until homogenization is achieved. While dispersing it by the homogenizer, tetramethylbutyl-peroxy-2-ethyl hexanoate (manufactured by NOF Corporation, trade name: Perocta O): 6 parts is gradually added to the suspension to form minute liquid drops of the polymerizable monomer composition.

The above liquid drop-dispersed suspension is heated to 90° C. by external heating while stirring in a reaction vessel capable of performing refluxing and thereby, a polymerization reaction is allowed to proceed. After thorough reaction while maintaining the temperature, the whole is cooled to room temperature to form a suspension of colored resin particles. Then, dilute hydrochloric acid is added dropwise thereto at room temperature to dissolve and remove $Ca_3(PO_4)_2$ and acid washing is performed. The suspension taken out is thoroughly washed with ion exchange water and solid-liquid separation is performed by Nusche type suction filtration. Then, the resultant one is further re-dispersed in ion exchange water at 40° C. and washed with stirring for 15 minutes. After this washing operation is repeated several times, solid-liquid separation is performed by Nutsche type suction filtration and freeze-drying is performed under vacuum to obtain toner particles (6).

The volume average particle diameter D50v of the toner particles (6) is 6.9 μm and the shape factor is 105.

(Manufacture of Toner Particles (7))
Styrene-butyl acrylate copolymer (copolymerization ratio (mass ratio)=79:21, weight average molecular weight Mw=140,000, glass transition temperature Tg=58° C.): 87 parts
Cyan pigment [Pigment Blue 15:3, manufactured by Dainichiseika Color & Chemicals Mfg. Co., Ltd.]: 6 parts
Low-molecular-weight polypropylene (softening temperature: 150° C.): 7 parts The above materials are charged into a Henschel mixer and pre-mixed and a powder mixture is thermally kneaded in Bumbary mixer. After being taken out, the resultant one is rolled into a plate shape by a twin-screw rolling roll and cooled and the kneaded product is roughly crushed with a hammer or the like. The roughly crushed one is finely pulverized using a hammer mill. Furthermore, particles having a size of 10 μm or more and a size of 2.0 μm or less are classified and eliminated to collect toner particles (7) having a volume average particle diameter of 7.2 μm. The shape factor of the toner particles (7) is 141.

(Manufacture of Toner Particles (8))
Toner particles (8) having a volume average particle diameter of 8.3 μm are collected by adjusting the classification elimination conditions after fine pulverization in the manufacture process of the toner particles (7). The shape factor of the toner particles (8) is 147.

Hereinafter, Table 1 collectively shows details of the toner particles (1) to (8). Incidentally, for the obtained toner particles, the volume average particle diameter and the average circularity are measured by already mentioned methods.

TABLE 1

| Toner particles | Production method | Binder resin | Volume average particle diameter (μm) | Shape factor SF1 |
|---|---|---|---|---|
| (1) | Aggregation and coalescence method | Polyester resin | 5.3 | 129 |
| (2) | Aggregation and coalescence method | Polyester resin | 3.6 | 127 |
| (3) | Aggregation and coalescence method | Styrene-acrylic resin | 5.7 | 131 |

TABLE 1-continued

| Toner particles | Production method | Binder resin | Volume average particle diameter (μm) | Shape factor SF1 |
|---|---|---|---|---|
| (4) | Aggregation and coalescence method | Styrene-acrylic resin | 2.8 | 109 |
| (5) | Ester elongation method | Polyester resin | 6.2 | 123 |
| (6) | Suspension polymerization method | Styrene-acrylic resin | 6.9 | 105 |
| (7) | Kneading and pulverizing method | Styrene-acrylic resin | 7.2 | 141 |
| (8) | Kneading and pulverizing method | Styrene-acrylic resin | 8.3 | 147 |

[Manufacture of External Additive]
(Preparation of Silica Particle Dispersion (1))

To a 1.5 L glass-made reaction vessel fitted with a stirrer, a dropping nozzle, and a thermometer are added 300 parts of methanol and 70 parts of 10% ammonia water, and the whole is mixed to obtain an alkali catalyst solution.

After the alkali catalyst solution is adjusted to 30° C., 185 parts of tetramethoxysilane (designated as TMOS) and 50 parts of 8.0% ammonia water are simultaneously added dropwise with stirring to obtain a hydrophilic silica particle dispersion (solid concentration: 12.0% by mass). Here, a time for dropwise addition is 30 minutes.

Thereafter, the obtained silica particle dispersion is concentrated to a solid concentration of 40% by mass by a Rotary Filter R-fine (manufactured by Kotobuki Industries Co., Ltd.). The concentrated one is used as a silica particle dispersion (1).

(Preparation of Silica Particle Dispersions (2) to (8))

Silica particle dispersions (2) to (8) are prepared in the same manner as in the case of the silica particle dispersion (1) except that the alkali catalyst solution (amount of methanol and amount of 10% ammonia water) and silica particle forming conditions (total amounts of TMOS and 8% ammonia water to be added dropwise to alkali catalyst solution and time for dropwise addition) are changed according to Table 2 in the preparation of the silica particle dispersion (1).

Hereinafter, Table 2 collectively shows details of the Silica particle dispersions (1) to (8).

TABLE 2

| | Alkali catalyst solution | | Silica particle forming conditions | | |
|---|---|---|---|---|---|
| Silica particle dispersion | Methanol (parts) | 10% Ammonia water (parts) | Total amount of TMOS added (parts) | Total amount of 8% ammonia water added (parts) | Time for dropwise addition |
| (1) | 300 | 70 | 185 | 50 | 30 minutes |
| (2) | 300 | 70 | 340 | 92 | 55 minutes |
| (3) | 300 | 46 | 40 | 25 | 30 minutes |
| (4) | 300 | 70 | 62 | 17 | 10 minutes |
| (5) | 300 | 70 | 700 | 200 | 120 minutes |
| (6) | 300 | 70 | 500 | 140 | 85 minutes |
| (7) | 300 | 70 | 1000 | 280 | 170 minutes |
| (8) | 300 | 70 | 3000 | 800 | 520 minutes |

(Manufacture of Surface-Treated Silica Particles (S1))

Using the silica particle dispersion (1), as shown below, the silica particles are subjected to a surface treatment with a siloxane compound under a supercritical carbon dioxide atmosphere. Incidentally, for the surface treatment, a carbon dioxide cylinder, a carbon dioxide pump, an entrainer pump, an autoclave fitted with a stirrer (volume: 500 ml), and an apparatus fitted with a pressure valve are used.

First, 250 parts of the silica particle dispersion (1) is charged into the autoclave fitted with a stirrer (volume: 500 ml) and the stirrer is rotated at 100 rpm. Thereafter, liquefied carbon dioxide is injected into the autoclave, pressure is elevated by the carbon dioxide pump while temperature is raised by a heater, and thereby the inside of the autoclave is made a supercritical state of 150° C. and 15 MPa. While the inside of the autoclave is maintained at 15 MPa with the pressure valve, supercritical carbon dioxide is circulated by the carbon dioxide pump to remove methanol and water from the silica particle dispersion (1) (solvent removal step), thereby obtaining silica particles (untreated silica particles).

Then, at the time point when the amount of the circulated supercritical carbon dioxide (integration amount: measured as a distributing amount of carbon dioxide in a standard state) reaches 900 parts, the circulation of the supercritical carbon dioxide is stopped.

Thereafter, in a state that the temperature of 150° C. and the pressure of 15 MPa are maintained by the heater and the carbon dioxide pump, respectively and the supercritical state of carbon dioxide is maintained in the autoclave, a treating agent solution in which 0.3 part of dimethylsilicone oil (DSO: trade name "KF-96 (manufactured by Shin-Etsu Chemical Co., Ltd.)") having a viscosity of 10,000 cSt as a siloxane compound is previously dissolved in 20 parts of hexamethyldisilazane (HMDS: manufactured by Yuki Gosei Kogyo Co., Ltd.) as a hydrophobilizing agent with respect to 100 parts of the above silica particles (untreated silica particles) is injected into the autoclave by the entrainer pump and subsequently, they are reacted at 180° C. for 20 minutes with stirring. Thereafter, supercritical carbon dioxide is again circulated to remove an excess treating agent solution. Then, the stirring is stopped and the pressure in the autoclave is opened until atmospheric pressure by opening the pressure valve and the temperature is dropped to room temperature (25° C.).

Thus, the solvent removal step and the surface treatment with the siloxane compound are successively conducted to obtain a surface-treated silica particles (S1).

(Manufacture of Surface-Treated Silica Particles (S2) to (S5), (S7) to (S9), (S12) to (S17))

Surface-treated silica particles (S2) to (S5), (S7) to (S9), (S12) to (S17) are manufactured in the same manner as in the case of the surface-treated silica particles (S1) except that the silica particle dispersion and the surface treating conditions (treating atmosphere, siloxane compound (species, viscosity and amount to be added), hydrophobilizing agent, and amount thereof to be added) are changed according to Table 3 in the manufacture of the surface-treated silica particles (S1).

(Manufacture of the Surface-Treated Silica Particles (S6))

Using the same dispersion as the silica particle dispersion (1) used in the manufacture of the surface-treated silica particles (S1), as shown below, the silica particles are subjected to a surface treatment with a siloxane compound under the air atmosphere.

An ester adapter and a cooling tube are attached to the reaction vessel used in the manufacture of the silica particle dispersion (1). The silica particle dispersion (1) is heated at 60 to 70° C. and, when methanol is distilled away, water is added thereto. Further, the whole is heated at 70 to 90° C. to distill away methanol, thereby obtaining an aqueous dispersion of the silica particles. With respect to 100 parts of silica solid matter in the aqueous dispersion, 3 parts of methyltrimethoxysilane (MTMS: manufactured by Shin-Etsu Chemical Co., Ltd.) is added at room temperature and the whole is reacted for 2 hours to perform the treatment of silica particle surface. After methyl isobutyl ketone is added to the surface treatment dispersion, the whole is heated at 80° C. to 110° C. to distill away methanol-water and, with respect to 100 parts of silica solid matter in the obtained dispersion, 80 parts of hexamethyldisilazane (HMDS: manufactured by Yuki Gosei Kogyo Co., Ltd.) and 1.0 part of dimethylsilicone oil (DSO: trade name "KF-96 (manufactured by Shin-Etsu Chemical Co., Ltd.)") having a viscosity of 10,000 cSt as a siloxane compound are added, followed by a reaction at 120° C. for 3 hours. After cooling, the product is dried by spray drying to obtain a surface-treated silica particles (S6).

(Manufacture of Surface-Treated Silica Particles (S10))

A surface-treated silica particles (S10) is manufactured in the same manner as in the case of the surface-treated silica particles (S1) except that fumed silica OX50 (AEROSIL OX50, manufactured by Japan Aerosil Co., Ltd.) is used instead of the silica particle dispersion (1). That is, 100 parts of OX50 is charged into the same autoclave fitted with a stirrer as that in the manufacture of the surface-treated silica particles (S1) and the stirrer is rotated at 100 rpm. Thereafter, liquefied carbon dioxide is injected into the autoclave, pressure is elevated by the carbon dioxide pump while temperature is raised by a heater, and thereby the inside of the autoclave is made a supercritical state of 180° C. and 15 MPa. While the inside of the autoclave is maintained at 15 MPa with the pressure valve, a treating agent solution in which 0.3 part of dimethylsilicone oil (DSO: trade name "KF-96 (manufactured by Shin-Etsu Chemical Co., Ltd.)") having a viscosity of 10,000 cSt as a siloxane compound is previously dissolved in 20 parts of hexamethyldisilazane (HMDS: manufactured by Yuki Gosei Kogyo Co., Ltd.) as a hydrophobilizing agent is injected into the autoclave by the entrainer pump and subsequently, they are reacted at 180° C. for 20 minutes with stirring. Thereafter, supercritical carbon dioxide is circulated to remove an excess treating agent solution, thereby obtaining a surface-treated silica particles (S10).

(Manufacture of Surface-Treated Silica Particles (S11))

A surface-treated silica particles (S11) is manufactured in the same manner as in the case of the surface-treated silica particles (S1) except that fumed silica A50 (AEROSIL A50, manufactured by Japan Aerosil Co., Ltd.) is used instead of the silica particle dispersion (1). That is, 100 parts of A50 is charged into the same autoclave fitted with a stirrer as that in the manufacture of the surface-treated silica particles (S1) and the stirrer is rotated at 100 rpm. Thereafter, liquefied carbon dioxide is injected into the autoclave, pressure is elevated by the carbon dioxide pump while temperature is raised by a heater, and thereby the inside of the autoclave is made a supercritical state of 180° C. and 15 MPa. While the inside of the autoclave is maintained at 15 MPa with the pressure valve, a treating agent solution in which 1.0 part of dimethylsilicone oil (manufactured by Shin-Etsu Chemical Co., Ltd.) having a viscosity of 10,000 cSt as a siloxane compound is previously dissolved in 40 parts of hexamethyldisilazane (HMDS: manufactured by Yuki Gosei Kogyo Co., Ltd.) as a hydrophobilizing agent is injected into the autoclave by the entrainer pump and subsequently, they are reacted at 180° C. for 20 minutes with stirring. Thereafter, supercritical carbon dioxide is circulated to remove an excess treating agent solution, thereby obtaining a surface-treated silica particles (S11).

(Manufacture of Surface-Treated Silica Particles (SC1))

A surface-treated silica particles (SC1) is manufactured in the same manner as in the case of the surface-treated silica particles (S1) except that any siloxane compound is not added in the manufacture of the surface-treated silica particles (S1).

(Manufacture of Surface-Treated Silica Particles (SC2) to (SC4))

Surface-treated silica particles (SC2) to (SC4)) are manufactured in the same manner as in the case of the surface-treated silica particles (S1) except that the silica particle dispersion and the surface treating conditions (treating atmosphere, siloxane compound (species, viscosity and amount to be added), hydrophobilizing agent, and amount thereof to be added) are changed according to Table 4 in the manufacture of the surface-treated silica particles (S1).

(Manufacture of Surface-Treated Silica Particles (SC5))

A surface-treated silica particles (SC5) is manufactured in the same manner as in the case of the surface-treated silica particles (S6) except that any siloxane compound is not added in the manufacture of the surface-treated silica particles (S6).

(Manufacture of Surface-Treated Silica Particles (SC6))

After the silica particle dispersion (8) is filtrated and dried at 120° C., the resultant one is placed in an electric furnace and is fired at 400° C. for 6 hours. Thereafter, 10 parts of HMDS is sprayed to 100 parts of the silica particles and dried by spray drying to manufacture a surface-treated silica particles (SC6).

(Physical Properties of Surface-Treated Silica Particles)

For the obtained surface-treated silica particles, the average equivalent circle diameter, the average circularity, the amount of the attached siloxane compound to the untreated silica particles (designated as "surface attaching amount" in the table), the compression aggregation degree, the particle compression ratio, and the particle dispersion degree are measured by already described methods.

Hereinafter, Table 3 and Table 4 show details of the surface-treated silica particles as a list. Incidentally, abbreviations in Table 3 and Table 4 are as follows.

DSO: dimethylsilicone oil
HMDS: hexamethyldisilazane

TABLE 3

| Surface-treated silica particles | Silica particle dispersion | Surface treating conditions ||||| 
| | | Siloxane compound |||| Hydrophobilizing agent/parts |
| | | species | Viscosity (cSt) | Adding amount (part(s)) | Treating atmosphere | |
|---|---|---|---|---|---|---|
| (S1) | (1) | DSO | 10000 | 0.3 | Supercritical $CO_2$ | HMDS/20 parts |
| (S2) | (1) | DSO | 10000 | 1.0 | Supercritical $CO_2$ | HMDS/20 parts |

TABLE 3-continued

| Surface-treated silica particles | Silica particle dispersion | Siloxane compound species | Viscosity (cSt) | Adding amount (part(s)) | Treating atmosphere | Hydrophobilizing agent/parts |
|---|---|---|---|---|---|---|
| (S3) | (1) | DSO | 5000 | 0.15 | Supercritical CO$_2$ | HMDS/20 parts |
| (S4) | (1) | DSO | 5000 | 0.5 | Supercritical CO$_2$ | HMDS/20 parts |
| (S5) | (2) | DSO | 10000 | 0.2 | Supercritical CO$_2$ | HMDS/20 parts |
| (S6) | (1) | DSO | 10000 | 1.0 | Air | HMDS/80 parts |
| (S7) | (3) | DSO | 10000 | 0.3 | Supercritical CO$_2$ | HMDS/20 parts |
| (S8) | (4) | DSO | 10000 | 0.3 | Supercritical CO$_2$ | HMDS/20 parts |
| (S9) | (1) | DSO | 50000 | 1.5 | Supercritical CO$_2$ | HMDS/20 parts |
| (S10) | Fumed silica OX50 | DSO | 10000 | 0.3 | Supercritical CO$_2$ | HMDS/20 parts |
| (S11) | Fumed silica A50 | DSO | 10000 | 1.0 | Supercritical CO$_2$ | HMDS/40 parts |
| (S12) | (3) | DSO | 5000 | 0.04 | Supercritical CO$_2$ | HMDS/20 parts |
| (S13) | (3) | DSO | 1000 | 0.5 | Supercritical CO$_2$ | HMDS/20 parts |
| (S14) | (3) | DSO | 10000 | 5.0 | Supercritical CO$_2$ | HMDS/20 parts |
| (S15) | (5) | DSO | 10000 | 0.5 | Supercritical CO$_2$ | HMDS/20 parts |
| (S16) | (6) | DSO | 10000 | 0.5 | Supercritical CO$_2$ | HMDS/20 parts |
| (S17) | (7) | DSO | 10000 | 0.5 | Supercritical CO$_2$ | HMDS/20 parts |

| | Characteristics of surface-treated silica particles | | | | |
|---|---|---|---|---|---|
| Surface-treated silica particles | Average equivalent circle diameter (nm) | Average circularity | Surface attaching amount (% by mass) | Compression aggregation degree (%) | Particle Compression ratio | Particle dispersion degree (%) |
| (S1) | 120 | 0.958 | 0.28 | 85 | 0.310 | 98 |
| (S2) | 120 | 0.958 | 0.98 | 92 | 0.280 | 97 |
| (S3) | 120 | 0.958 | 0.12 | 80 | 0.320 | 99 |
| (S4) | 120 | 0.958 | 0.47 | 88 | 0.295 | 98 |
| (S5) | 140 | 0.962 | 0.19 | 81 | 0.360 | 99 |
| (S6) | 120 | 0.958 | 0.50 | 83 | 0.380 | 93 |
| (S7) | 130 | 0.850 | 0.29 | 68 | 0.350 | 92 |
| (S8) | 90 | 0.935 | 0.29 | 94 | 0.390 | 95 |
| (S9) | 120 | 0.958 | 1.25 | 95 | 0.240 | 91 |
| (S10) | 80 | 0.680 | 0.26 | 84 | 0.395 | 92 |
| (S11) | 45 | 0.740 | 0.91 | 88 | 0.396 | 91 |
| (S12) | 130 | 0.850 | 0.02 | 62 | 0.360 | 96 |
| (S13) | 130 | 0.850 | 0.46 | 90 | 0.380 | 92 |
| (S14) | 130 | 0.850 | 4.70 | 95 | 0.360 | 91 |
| (S15) | 185 | 0.971 | 0.43 | 61 | 0.209 | 96 |
| (S16) | 164 | 0.97 | 0.41 | 64 | 0.224 | 97 |
| (S17) | 210 | 0.978 | 0.44 | 60 | 0.205 | 98 |

TABLE 4

| | Surface treating conditions | | | | | |
|---|---|---|---|---|---|---|
| | | Siloxane compound | | | | |
| Surface-treated silica particles | Silica particle dispersion | species | Viscosity (cSt) | Adding amount (part(s)) | Treating atmosphere | Hydrophobilizing agent/parts |
| (SC1) | (1) | — | — | — | Supercritical CO$_2$ | HMDS/20 parts |
| (SC2) | (1) | DSO | 100 | 3.0 | Supercritical CO$_2$ | HMDS/20 parts |
| (SC3) | (1) | DSO | 1000 | 8.0 | Supercritical CO$_2$ | HMDS/20 parts |
| (SC4) | (3) | DSO | 3000 | 10.0 | Supercritical CO$_2$ | HMDS/20 parts |
| (SC5) | (1) | — | — | — | Air | HMDS/80 parts |
| (SC6) | (8) | — | — | — | Air | HMDS/10 parts |

TABLE 4-continued

| Surface-treated silica particles | Characteristics of surface-treated silica particles | | | | | |
|---|---|---|---|---|---|---|
| | Average equivalent circle diameter (nm) | Average circularity | Surface attaching amount (% by mass) | Compression aggregation degree (%) | Particle Compression ratio | Particle dispersion degree (%) |
| (SC1) | 120 | 0.958 | — | 55 | 0.415 | 99 |
| (SC2) | 120 | 0.958 | 2.5 | 98 | 0.450 | 75 |
| (SC3) | 120 | 0.958 | 7.0 | 99 | 0.360 | 83 |
| (SC4) | 130 | 0.850 | 8.5 | 99 | 0.380 | 85 |
| (SC5) | 120 | 0.958 | — | 62 | 0.425 | 98 |
| (SC6) | 300 | 0.980 | — | 60 | 0.197 | 93 |

Examples 1 to 40, Comparative Examples 1 to 6

A toner of each example is obtained by adding 0.2 part of silica particles shown in Table 5 to 100 parts of toner particles shown in Table 5 and mixing them in a Henschel mixer at 2,000 rpm for 3 minutes.

Then, each obtained toner and a carrier are placed in a ratio of toner/carrier=5/95 (mass ratio) in a V-blender and are stirred for 20 minutes to obtain each developer.

Incidentally, as the carrier, one manufactured as follows is used. Since the charging amount and the resistance value level were controlled corresponding to each toner, sometimes, coating resin composition, an amount of carbon black, a coating amount, and the like are appropriately changed but all carriers are manufactured by the same method.

Ferrite particles (volume average particle diameter: 35 μm): 100 parts
Toluene: 14 parts
Styrene-methyl methacrylate copolymer: 2 parts (component ratio: 90/10, Mw=80,000)
Carbon black (VXC-72: manufactured by Cabol Corporation): 0.2 part First, the above components excluding ferrite particles are stirred with a stirrer for 10 minutes to prepare a dispersed coating liquid. Then, after the coating liquid and ferrite particles are placed in a vacuum degassing type kneader and are stirred at 60° C. for 30 minutes, the mixture is degassed under reduced pressure while further heating and is dried, thereby obtaining a carrier.

[Evaluation]

For the developer obtained in each example, the charge maintaining properties of the toner and filming on the photoreceptor surface are evaluated. Results thereof are shown in Table 5.

(Charge Maintaining Properties of Toner)

In the evaluation of filming on the photoreceptor surface to be mentioned below, an initial charging amount of a toner before image formation and charging amounts of a toner with time after image output (charging amounts of a toner after output of 5,000 sheets, after output of 10,000 sheets, and after output of 20,000 sheets) are measured by a blow-off charging amount measuring machine (manufactured by Toshiba Chemical Corporation, TB-200).

Then, based on to following expression, the charge maintaining properties are evaluated according to evaluation criteria.

Expression: Charge maintaining properties (%)=(1−(Charging amount of toner with time/Initial charging amount of toner))×100

Incidentally, the charging amount of a toner is a corrected value considering a toner concentration in a developer.

The evaluation criteria are as follows.

A (excellent): 7% or less

B (good): more than 7% and 12% or less

C (moderate): more than 12% and 17% or less

D (bad): more than 17%

(Filming on Photoreceptor Surface)

The developer obtained in each example is filled into a developing device of a modified model of an image formation apparatus "ApeosPort IV-05570 manufactured by Fuji Xerox Co., Ltd. By the image formation apparatus, a pattern image having an image density of 5% is output on 30,000 sheets of A4-size paper under an environment of a temperature of 22° C. and a humidity of 55 RH. Meanwhile, for every output of 5,000 sheets, the surface of the photoreceptor is observed by a laser microscope and a filming state on the surface of the photoreceptor is evaluated according to the following criteria (image-processed area ratio of streaky or spotty surface attached matter present in an observation viewing field). Moreover, for a sample whose filming state is an area ratio of more than 20%, the evaluation is stopped in the way.

A: The area ratio is 5% or less

B: The area ratio is more than 5% and 10% or less

C: The area ratio is more than 10% and 20% or less

D: The area ratio is more than 20%

Incidentally, in the case where the evaluation is C or higher at the time when output of 5,000 sheets is finished, the case is set to an acceptable range.

TABLE 5

| | Developer | | | Filming on photoreceptor surface | | | | | |
|---|---|---|---|---|---|---|---|---|---|
| | Toner particles | Surface-treated silica particles | Initial | After output of 5,000 sheets | After output of 10,000 sheets | After output of 15,000 sheets | After output of 20,000 sheets | After output of 25,000 sheets | After output of 30,000 sheets |
| Example 1 | (1) | (S1) | A | A | A | A | A | A | A |
| Example 2 | (1) | (S2) | A | A | A | A | A | A | A |
| Example 3 | (1) | (S3) | A | A | A | A | A | A | A |
| Example 4 | (1) | (S4) | A | A | A | A | A | A | A |
| Example 5 | (1) | (S5) | A | A | A | A | A | A | A |
| Example 6 | (1) | (S6) | A | A | A | A | B | B | C |
| Example 7 | (1) | (S7) | A | A | A | A | A | A | B |
| Example 8 | (1) | (S8) | A | A | A | A | A | B | C |
| Example 9 | (1) | (S9) | A | A | A | A | A | A | A |
| Example 10 | (1) | (S10) | A | A | A | A | B | B | C |
| Example 11 | (1) | (S11) | A | A | A | A | B | B | C |
| Example 12 | (1) | (S12) | A | A | A | A | A | A | B |
| Example 13 | (1) | (S13) | A | A | A | A | A | B | C |
| Example 14 | (1) | (S14) | A | A | A | A | A | A | A |
| Example 15 | (1) | (S15) | A | A | A | B | B | C | D |
| Example 16 | (1) | (S16) | A | A | A | A | B | C | D |
| Example 17 | (1) | (S17) | A | A | B | B | B | C | D |
| Example 18 | (2) | (S1) | A | A | A | A | A | A | A |
| Example 19 | (3) | (S1) | A | A | A | A | A | A | B |
| Example 20 | (4) | (S1) | A | A | A | A | A | A | B |
| Example 21 | (5) | (S1) | A | A | A | A | A | A | B |
| Example 22 | (6) | (S1) | A | A | A | A | A | B | C |
| Example 23 | (7) | (S1) | A | A | A | A | A | B | C |
| Example 24 | (8) | (S1) | A | A | A | B | C | D | |
| Example 25 | (8) | (S2) | A | A | A | B | C | D | |
| Example 26 | (8) | (S3) | A | A | A | B | C | D | |
| Example 27 | (8) | (S4) | A | A | A | B | C | D | |
| Example 28 | (8) | (S5) | A | A | A | B | C | D | |
| Example 29 | (8) | (S6) | A | C | C | D | | | |
| Example 30 | (8) | (S7) | A | A | B | C | D | | |
| Example 31 | (8) | (S8) | A | B | C | D | | | |
| Example 32 | (8) | (S9) | A | A | A | B | C | D | |
| Example 33 | (8) | (S10) | A | C | C | D | | | |
| Example 34 | (8) | (S11) | A | C | C | D | | | |
| Example 35 | (8) | (S12) | A | A | B | C | D | | |
| Example 36 | (8) | (S13) | A | B | C | D | | | |
| Example 37 | (8) | (S14) | A | A | A | B | C | D | |
| Example 38 | (8) | (S15) | A | C | D | | | | |
| Example 39 | (8) | (S16) | A | C | D | | | | |
| Example 40 | (8) | (S17) | B | C | D | | | | |
| Comparative Example 1 | (1) | (SC1) | A | D | | | | | |
| Comparative Example 2 | (1) | (SC2) | A | D | | | | | |
| Comparative Example 3 | (1) | (SC3) | A | D | | | | | |
| Comparative Example 4 | (1) | (SC4) | A | D | | | | | |
| Comparative Example 5 | (1) | (SC5) | A | D | | | | | |
| Comparative Example 6 | (1) | (SC6) | A | D | | | | | |

From the above results, it is found that the charge maintaining properties of toners are high and the filming on the photoreceptor surface is suppressed in the present Examples as compared to Comparative Examples.

Particularly, in Examples 1 to 5 and 14 in which silica particles having a compression aggregation degree of from 70% to 95% and a particle compression ratio of from 0.28 to 0.36 are used as an external additive, it is found that the charge maintaining properties of toners are high and the filming on the photoreceptor surface is suppressed, as compared to other Examples.

Moreover, in Examples 1 to 20 in which aggregation and coalescence toner particles are used, it is found that the charge maintaining properties of toners are high and the filming on the photoreceptor surface is suppressed, as compared to Examples in which toner particles produced by other methods are used.

[Manufacture of Toner Particles]
(Manufacture of Toner Particles (2-1))

Styrene-butyl acrylate copolymer (copolymerization ratio (mass ratio)=80:20, weight average molecular weight Mw=130,000, glass transition temperature Tg=59° C.): 88 parts
Cyan pigment (C. I. Pigment Blue 15:3): 6 parts
Low molecular weight polypropylene (softening temperature: 148° C.): 6 parts The above materials are mixed in a Henschel mixer and the resultant one is thermally kneaded in an extruder. After cooling, the kneaded matter is roughly crushed/finely pulverized and the pulverized matter is classified to obtain toner particles (2-1) having a volume average particle diameter of 6.5 μm.

(Manufacture of Toner Particles (2-2))
—Preparation of Polyester Resin Particle Dispersion (1)—
  Ethylene glycol (manufactured by Wako Pure Chemical Industries. Ltd.): 37 parts
  Neopentyl glycol (manufactured by Wako Pure Chemical Industries. Ltd.): 65 parts
  1,9-Nonanediol (manufactured by Wako Pure Chemical Industries. Ltd.): 32 parts
  Terephthalic acid (manufactured by Wako Pure Chemical Industries, Ltd.): 96 parts The above monomers are charged into a flask, temperature is raised to 200° C. over a period of 1 hour, and, after it is confirmed that the inside of the reaction system is stirred, 1.2 parts of dibutyltin oxide is charged. Furthermore, while distilling away formed water, the temperature is raised from the temperature to 240° C. over 6 hours and the dehydration condensation reaction is continued at 240° C. for another 4 hours to obtain a polyester resin A having an acid value of 9.4 mgKOH/g, a weight average molecular weight of 13,000, and a glass transition temperature of 62° C.

Then, the polyester resin A is transferred to a Cavitron CD1010 (manufactured by Eurotec Co., Ltd.) in a still melted state at a rate of 100 parts per minute. A dilute ammonia water having a concentration of 0.37% obtained by diluting a reagent ammonia water with ion exchange water is placed in an aqueous medium tank separately prepared and is transferred to the above Cavitron at a rate of 0.1 L per minute while heating to 120° C. by a heat exchanger together with the polyester resin melted body. The Cavitron is operated under conditions that a rotation rate of a rotor is 60 Hz and pressure is 5 kg/cm$^2$, thereby obtaining a polyester resin particle dispersion (1) in which rein particles having a volume average particle diameter of 160 nm, a solid content of 30%, a glass transition temperature of 62° C., and a weight average molecular weight Mw of 13,000 are dispersed.

—Preparation of Colorant Particle Dispersion—
  Cyan pigment [Pigment Blue 15:3, manufactured by Dainichiseika Color & Chemicals Mfg. Co., Ltd.]: 10 parts
  Anionic surfactant [Neogen SC. manufactured by DKS Co., Ltd.]: 2 parts
  Ion exchange water: 80 parts The above components are mixed and dispersed for 1 hour using a high-pressure impact type dispersing machine Ultimizer [HJP 30006, SUGINO MASHINE LIMITED] to obtain a colorant particle dispersion having a volume average particle diameter of 180 nm and a solid content of 20%.

—Preparation of Release Agent Particle Dispersion—
  Carnauba wax [RC-160, melting temperature: 84° C. manufactured by Toa Kasei Co., Ltd.]: 50 parts
  Anionic surfactant [Neogen SC, manufactured by DKS Co., Ltd.]: 2 parts
  Ion exchange water: 200 parts The above components are heated to 120° C. and are mixed/dispersed in Ultra Turrax T50 manufactured by IKA, and subsequently the resulting one is subjected to a dispersion treatment in a pressure injection type homogenizer to obtain a release agent particle dispersion having a volume average particle diameter of 200 nm and a solid content of 20%.

—Manufacture of Toner Particles (2-2)—
  Polyester resin particle dispersion (1): 200 parts
  Colorant particle dispersion: 25 parts
  Release agent particle dispersion; 30 parts
  Polyaluminum chloride: 0.4 part
  Ion exchange water: 100 parts The above components are charged into a stainless steel-made flask and are stirred and mixed using Ultra Turrax manufactured by IKA, and subsequently, the flask is heated to 48° C. on a heating oil bath with stirring. After it is maintained at 48° C. for 30 minutes, 70 parts of the polyester resin particle dispersion (1) is further added.

Thereafter, after pH in the system is adjusted to 8.0 using an aqueous sodium hydroxide solution having a concentration of 0.5 mol/L, the stainless steel-made flask is tightly sealed and heated to 90° C. with magnetically sealing the seal of a stirring shaft while stirring is continued, followed by maintenance for 3 hours. After completion of the reaction, the whole is cooled to room temperature at a temperature-dropping rate of 2° C./minute and, after filtration and washing with ion exchange water, solid-liquid separation is conducted by Nutsche type suction filtration. This is further re-dispersed using 3 L of ion exchange water at 30° C. and washed by stirring for 15 minutes at 300 rpm. This washing operation is repeated further six times and, when pH of the filtrate becomes 7.54 and electric conductivity becomes 6.5 μS/cm, solid-liquid separation is performed by Nutsche type suction filtration using a filter paper of No. 5A. Then, vacuum drying is continued for 12 hours to obtain toner particles (2-2).

The volume average particle diameter D50v of the toner particles (2-2) is 5.8 μm and the average circularity is 0.967.

(Medium-Resistance Particles)

As medium-resistance particles, there are prepared inorganic oxide particles each having the kind, volume resistivity, and average equivalent circle diameter shown in Table 6. Incidentally, the parts shown in the column of "Kind" in Table 6 indicates parts of a treating amount of the surface treating agent with respect to particles.

TABLE 6

| Titanium oxide particle No. | Kind | Volume resistivity (Ωcm) | Average equivalent circle diameter (nm) |
|---|---|---|---|
| (T1) | Rutile type titanium oxide particles (20 parts n-decyltrimethoxysilane treatment) | $1.2 \times 10^{14}$ | 15 |
| (T2) | Metatitanic acid particles (40 parts n-butyltrimethoxysilane treatment) | $3.5 \times 10^{10}$ | 48 |
| (T3) | Anatase type titanium oxide particles (8 parts methyltrimethoxysilane treatment) | $7.6 \times 10^{9}$ | 30 |
| (T4) | Zinc oxide particles (15 parts methyltrimethoxysilane) | $9.3 \times 10^{9}$ | 20 |
| (TC1) | Alminum oxide particles (20 parts n-decyltrimethoxysilane) | $3.2 \times 10^{15}$ | 20 |
| (TC2) | Metatitanic acid particles (10 parts n-butyltrimethoxysilane) | $8.5 \times 10^{7}$ | 30 |

Examples 2-1 to 2-28, Comparative Examples 2-1 to 2-8

To 100 parts of toner particles shown in Table 7 are added the silica particles and medium-resistance particles shown in Table 7 in amounts of part(s) shown in Table 7, and the whole is mixed at 2,000 rpm for 3 minutes in a Henschel mixer to obtain a toner of each example.

Then, each obtained toner and a carrier are placed in a ratio of toner/carrier=5/95 (mass ratio) in a V-blender and are stirred for 20 minutes to obtain each developer.

Incidentally, as the carrier, one manufactured as follows is used.

Ferrite particles (volume average particle diameter: 50 μm): 100 parts
Toluene: 14 parts
Styrene-methyl methacrylate copolymer; 2 parts
(component ratio: 90/10, Mw=80,000)
Carbon black (R330: manufactured by Cabot Corporation): 0.2 part First, the above components excluding ferrite particles are stirred with a stirrer for 10 minutes to prepare a dispersed coating liquid. Then, after the coating liquid and ferrite particles are placed in a vacuum degassing type kneader and are stirred at 60° C. for 30 minutes, the mixture is degassed under reduced pressure while further heating and is dried, thereby obtaining a carrier.

[Evaluation]

For the developer obtained in each example, "density/fogging" are evaluated. Results thereof are shown in Table 7.

(Evaluation of Density/Fogging)

The developer obtained in each example is filled into a developing device of an image formation apparatus "a modified model of DocuCentre-V C7785 manufactured by Fuji Xerox Co., Ltd.). By the image formation apparatus, an image having an image density of 2% is output on 3,000 sheets of A4-sized paper under an environment of a temperature of 30° C. and a humidity of 90% RH. Thereafter, a solid patch is output and the density is measured by X-rite. Density reproducibility is evaluated based on the image density. Furthermore, an image having an image density of 80% is output on 20,000 sheets of A4-sized paper. Meanwhile, the apparatus is stopped at every time after output of 10,000 sheets, after output of 15,000 sheets, and after output of 20,000 sheets, the non-image part on the photoreceptor is transferred to a tape, and an image density of the tape is measured by Xrite. Fogging on the photoreceptor is evaluated based on the image density.

On the other hand, the non-image part on the paper output immediately before the stop of the apparatus is visually observed, and the fogging on the paper is evaluated according to the following criteria.

Evaluation criteria for the density reproducibility are as follows.

Good: a density of 1.45 or more
Bad: a density of less than 1.40

Evaluation criteria for fogging on the photoreceptor and the paper are as follows.

G7: Fogging cannot be confirmed on the photoreceptor and on the paper after completion of 20,000 sheets.
G6: Fogging cannot be confirmed on the paper but can be confirmed on the photoreceptor after completion of 20,000 sheets.
G5: Fogging cannot be confirmed on the photoreceptor and on the paper after completion of 15,000 sheets.
G4: Fogging cannot be confirmed on the paper but can be confirmed on the photoreceptor after completion of 15,000 sheets.
G3: Fogging cannot be confirmed on the photoreceptor and on the paper after completion of 10,000 sheets.
G2: Fogging cannot be confirmed on the paper but can be confirmed on the photoreceptor after completion of 10,000 sheets.
G1: Fogging can be confirmed on the paper after completion of 10,000 sheets.

Incidentally, a case where the evaluation reaches G2 is set to an acceptable range. Moreover, in the case where fogging can be confirmed on the paper after completion of 10,000 sheets, further evaluation is not performed.

TABLE 7

| | Developer | | | | | Density reproducibility evaluation | | |
|---|---|---|---|---|---|---|---|---|
| | Toner particles | Surface-treated silica particles | | Medium-resistance particles | | Density after 3,000 sheets | Judgment | Fogging evaluation |
| | | Kind | part(s) | Kind | part(s) | | | |
| Example 2-1 | (2-2) | (S1) | 0.7 | (T1) | 1.52 | 1.55 | Good | G7 |
| Example 2-2 | (2-2) | (S2) | 0.7 | (T1) | 1.52 | 1.53 | Good | G7 |
| Example 2-3 | (2-2) | (S3) | 0.7 | (T1) | 1.52 | 1.52 | Good | G7 |
| Example 2-4 | (2-2) | (S4) | 0.7 | (T1) | 1.52 | 1.55 | Good | G7 |
| Example 2-5 | (2-2) | (S5) | 0.6 | (T1) | 1.30 | 1.53 | Good | G7 |
| Example 2-6 | (2-2) | (S6) | 0.7 | (T1) | 1.52 | 1.5 | Good | G5 |
| Example 2-7 | (2-2) | (S7) | 0.6 | (T1) | 1.40 | 1.51 | Good | G6 |
| Example 2-8 | (2-2) | (S8) | 0.9 | (T1) | 2.03 | 1.55 | Good | G5 |
| Example 2-9 | (2-2) | (S9) | 0.7 | (T1) | 1.52 | 1.55 | Good | G6 |
| Example 2-10 | (2-2) | (S10) | 1.1 | (T1) | 2.28 | 1.52 | Good | G5 |
| Example 2-11 | (2-2) | (S11) | 1.9 | (T1) | 4.05 | 1.52 | Good | G5 |
| Example 2-12 | (2-2) | (S12) | 0.6 | (T1) | 1.40 | 1.54 | Good | G6 |
| Example 2-13 | (2-2) | (S13) | 0.6 | (T1) | 1.40 | 1.53 | Good | G5 |
| Example 2-14 | (2-2) | (S14) | 0.6 | (T1) | 1.40 | 1.52 | Good | G7 |
| Example 2-15 | (2-2) | (S15) | 0.5 | (T1) | 0.99 | 1.51 | Good | G4 |
| Example 2-16 | (2-2) | (S16) | 0.5 | (T1) | 1.11 | 1.52 | Good | G4 |
| Example 2-17 | (2-2) | (S17) | 0.4 | (T1) | 0.87 | 1.52 | Good | G4 |
| Example 2-18 | (2-2) | (S1) | 0.7 | (T2) | 1.52 | 1.51 | Good | G6 |
| Example 2-19 | (2-2) | (S1) | 0.7 | (T3) | 1.52 | 1.55 | Good | G5 |
| Example 2-20 | (2-2) | (S1) | 0.7 | (T4) | 1.52 | 1.54 | Good | G5 |
| Example 2-21 | (2-1) | (S1) | 0.6 | (T1) | 1.36 | 1.52 | Good | G5 |

TABLE 7-continued

| | Toner particles | Developer Surface-treated silica particles Kind | part(s) | Medium-resistance particles Kind | part(s) | Density reproducibility evaluation Density after 3,000 sheets | Judgment | Fogging evaluation |
|---|---|---|---|---|---|---|---|---|
| Example 2-22 | (2-1) | (S2) | 0.6 | (T1) | 1.36 | 1.5 | Good | G5 |
| Example 2-23 | (2-1) | (S3) | 0.6 | (T1) | 1.36 | 1.51 | Good | G5 |
| Example 2-24 | (2-1) | (S4) | 0.6 | (T1) | 1.36 | 1.54 | Good | G5 |
| Example 2-25 | (2-1) | (S5) | 0.6 | (T1) | 1.36 | 1.52 | Good | G5 |
| Example 2-26 | (2-1) | (S15) | 0.4 | (T4) | 0.88 | 1.53 | Good | G2 |
| Example 2-27 | (2-1) | (S16) | 0.5 | (T4) | 0.99 | 1.52 | Good | G2 |
| Example 2-28 | (2-1) | (S17) | 0.4 | (T4) | 0.78 | 1.52 | Good | G2 |
| Comparative Example 2-1 | (2-2) | (SC1) | 0.7 | (T1) | 1.52 | 1.52 | Good | G1 |
| Comparative Example 2-2 | (2-2) | (SC2) | 0.7 | (T1) | 1.52 | 1.53 | Good | G1 |
| Comparative Example 2-3 | (2-2) | (SC3) | 0.7 | (T1) | 1.52 | 1.51 | Good | G1 |
| Comparative Example 2-4 | (2-2) | (SC4) | 0.6 | (T1) | 1.40 | 1.51 | Good | G1 |
| Comparative Example 2-5 | (2-2) | (SC5) | 0.7 | (T1) | 1.52 | 1.51 | Good | G1 |
| Comparative Example 2-6 | (2-2) | (SC6) | 0.3 | (T1) | 0.61 | 1.55 | Good | G1 |
| Comparative Example 2-7 | (2-2) | (S1) | 0.7 | (TC1) | 1.52 | 1.3 | Bad | G1 |
| Comparative Example 2-8 | (2-2) | (S1) | 0.7 | (TC2) | 1.52 | 1.51 | Good | G1 |

From the above results, it is found that the generation of fogging is suppressed in Examples 2-1 to 2-28 as compared to Comparative Examples 2-1 to 2-8. Moreover, in Examples 2-1 to 2-28, it is found that the charge maintaining properties of toners are high. However, it is confirmed that staining in the machine is bad in Examples 2-10 and 2-11 as compared to Examples 2-1 to 2-9 and 2-12 to 2-28.

Particularly, in Examples 2-1 to 2-5 and 2-14 in which silica particles having a compression aggregation degree of from 70% to 95% and a particle compression ratio of from 0.28 to 0.36 are applied as an external additive, it is found that the generation of fogging on the photoreceptor and on the paper is suppressed as compared to Examples 2-6 to 2-13 and 2-15 to 2-28.

What is claimed is:

1. An electrostatic charge image developing toner comprising:
   toner particles; and
   silica particles having a compaction aggregation degree of from 60% to 95% and a particle compaction ratio of from 0.20 to 0.40.

2. The electrostatic charge image developing toner according to claim 1, wherein the toner particles have a volume average particle diameter of from 3.0 µm to 8.0 µm.

3. The electrostatic charge image developing toner according to claim 1, wherein the silica particles have an average equivalent circle diameter of from 40 nm to 200 nm.

4. The electrostatic charge image developing toner according to claim 1, wherein the silica particles have a degree of particle dispersion of 90% or more and 100% or less.

5. The electrostatic charge image developing toner according to claim 1, wherein the silica particles are silica particles that are surface-treated with a siloxane compound having a viscosity of from 1,000 cSt to 50,000 cSt and have a surface attaching amount of the siloxane compound of from 0.01% by mass to 5% by mass.

6. The electrostatic charge image developing toner according to claim 5, wherein the siloxane compound is a silicone oil.

7. The electrostatic charge image developing toner according to claim 1, which comprises inorganic oxide particles having a volume resistivity of from $1.0 \times 10^8$ Ωcm to $1.0 \times 10^{15}$ Ωcm.

8. The electrostatic charge image developing toner according to claim 7, wherein the average equivalent circle diameter of the silica particles is larger than that of the inorganic oxide particles.

9. The electrostatic charge image developing toner according to claim 7, wherein the inorganic oxide particles are titanium oxide particles.

10. The electrostatic charge image developing toner according to claim 7, wherein the inorganic oxide particles have an average equivalent circle diameter of from 7 nm to 50 nm.

11. The electrostatic charge image developing toner according to claim 1, wherein the toner particles contain a polyester resin.

12. The electrostatic charge image developing toner according to claim 11, wherein the polyester resin has a glass transition temperature of from 50° C. to 80° C.

13. The electrostatic charge image developing toner according to claim 11, wherein the polyester resin has a weight average molecular weight Mw of from 5,000 to 1,000,000.

14. The electrostatic charge image developing toner according to claim 11, wherein the polyester resin has a number average molecular weight Mn of from 2,000 to 100,000.

15. The electrostatic charge image developing toner according to claim 11, wherein the polyester resin has a molecular weight distribution Mw/Mn of from 1.5 to 100.

16. The electrostatic charge image developing toner according to claim 1, wherein the toner particles contain a release agent having a melting temperature of from 50° C. to 110° C.

17. The electrostatic charge image developing toner according to claim 16, wherein content of the release agent is from 1% by mass to 20% by mass based on the whole toner particles.

18. An electrostatic charge image developer comprising the electrostatic charge image developing toner according to claim 1.

19. A toner cartridge that accommodates the electrostatic charge image developing toner according to claim 1 and is detachable from an image forming apparatus.

* * * * *